(12) United States Patent
Hattori et al.

(10) Patent No.: US 10,756,324 B2
(45) Date of Patent: *Aug. 25, 2020

(54) PRISMATIC SEALED SECONDARY BATTERY

(71) Applicant: SANYO Electric Co., Ltd., Moriguchi-shi, Osaka (JP)

(72) Inventors: Takayuki Hattori, Minamiawaji (JP); Takenori Kimura, Naruto (JP); Yasuhiro Yamauchi, Sumoto (JP); Toshiyuki Nohma, Kobe (JP)

(73) Assignee: SANYO Electric Co., Ltd., Osaka (JP)

( * ) Notice: Subject to any disclaimer, the term of this patent is extended or adjusted under 35 U.S.C. 154(b) by 346 days.

This patent is subject to a terminal disclaimer.

(21) Appl. No.: 15/830,943

(22) Filed: Dec. 4, 2017

(65) Prior Publication Data

US 2018/0090723 A1    Mar. 29, 2018

Related U.S. Application Data

(63) Continuation of application No. 14/599,007, filed on Jan. 16, 2015, now Pat. No. 9,871,230, which is a
(Continued)

(30) Foreign Application Priority Data

Jul. 29, 2010 (JP) ................. 2010-170551

(51) Int. Cl.
*H01M 2/26* (2006.01)
*H01M 2/18* (2006.01)
(Continued)

(52) U.S. Cl.
CPC ............. *H01M 2/26* (2013.01); *H01M 2/024* (2013.01); *H01M 2/0217* (2013.01);
(Continued)

(58) Field of Classification Search
CPC ........ H01M 2/26; H01M 2/1653; H01M 2/18; H01M 2/30; H01M 2/024; H01M 2/0217; H01M 2/263
See application file for complete search history.

(56) References Cited

U.S. PATENT DOCUMENTS 5,155,320 A    10/1992    Simmons
6,027,831 A    2/2000    Inoue et al.
(Continued)

FOREIGN PATENT DOCUMENTS

CN    101335339 A    12/2008
CN    101335340 A    12/2008
(Continued)

OTHER PUBLICATIONS

U.S. Office Action dated Aug. 27, 2012, issued in U.S. Appl. No. 13/218,697.
(Continued)

*Primary Examiner* — Eugenia Wang
(74) *Attorney, Agent, or Firm* — Westerman, Hattori, Daniels & Adrian, LLP

(57) ABSTRACT

The positive electrode substrate exposed portions or the negative electrode substrate exposed portions, or both, of an electrode assembly is split into two groups, and therebetween is disposed an intermediate member made of a resin material and holding one or more connecting conductive members. Collector members for the substrate exposed portions split into two groups is electrically joined by a resistance welding method to the substrate exposed portions split into two groups, together with the connecting conductive member(s) of the intermediate member. The resin material portion of the intermediate member protrudes, in the extension direction of the substrate exposed portions split into two groups, beyond the ends of the substrate exposed portions split into two groups and the ends of the
(Continued)

collector member to a prismatic outer can. This structure enables enhanced resistance between the substrate exposed portions and the collector member and curbs variation in the welding strength.

18 Claims, 13 Drawing Sheets

Related U.S. Application Data continuation of application No. 13/192,292, filed on Jul. 27, 2011, now Pat. No. 8,968,914.

(51) Int. Cl.
*H01M 2/16* (2006.01)
*H01M 2/02* (2006.01)
*H01M 2/30* (2006.01)

(52) U.S. Cl.
CPC ........... *H01M 2/1653* (2013.01); *H01M 2/18* (2013.01); *H01M 2/263* (2013.01); *H01M 2/30* (2013.01)

(56) References Cited

U.S. PATENT DOCUMENTS

| | | |
|---|---|---|
| 6,515,449 B1 | 2/2003 | Thomas et al. |
| 7,807,285 B1 | 10/2010 | Berg et al. |
| 8,460,811 B2 | 6/2013 | Hattori et al. |
| 2001/0021471 A1 | 9/2001 | Xing et al. |
| 2002/0146620 A1 | 10/2002 | Connell |
| 2004/0081890 A1 | 4/2004 | Xing et al. |
| 2005/0287431 A1 | 12/2005 | Cho |
| 2006/0234120 A1 | 10/2006 | Hamasaki et al. |
| 2007/0009793 A1 | 1/2007 | Kim et al. |
| 2007/0105015 A1 | 5/2007 | Munenaga et al. |
| 2007/0117009 A1 | 5/2007 | Yamauchi et al. |
| 2009/0004561 A1 | 1/2009 | Nansaka et al. |
| 2009/0004562 A1 | 1/2009 | Inagaki et al. |
| 2009/0087735 A1 | 4/2009 | Yoon et al. |
| 2009/0104525 A1 | 4/2009 | Nakagawa et al. |
| 2011/0195286 A1 | 8/2011 | Aota et al. |
| 2011/0195287 A1 | 8/2011 | Kamifuji et al. |
| 2011/0311851 A1 | 12/2011 | Shinoda et al. |

FOREIGN PATENT DOCUMENTS

| | | |
|---|---|---|
| JP | 58-113268 U | 8/1983 |
| JP | 2000-040501 A | 2/2000 |
| JP | 2003-249423 A | 9/2003 |
| JP | 2005-216825 A | 8/2005 |
| JP | 2006-228551 A | 8/2006 |
| JP | 2012-227110 A | 11/2012 |

OTHER PUBLICATIONS

Extended European Search Report dated Jan. 30, 2012, issued in European Patent Application No. 11173780.5.
U.S. Office Action dated Mar. 21, 2013, issued in U.S. Appl. No. 12/878,479.
Japanese Office Action dated Feb. 27, 2014, issued in corresponding Japanese Patent Application No. 2010-170551, (3 pages).
Chinese Office Action dated Nov. 5, 2014, issued in CN Application No. 201110193764.3 with English translation (13 pages).
U.S. Non-Final Office Action dated Nov. 25, 2013, issued in corresponding U.S. Appl. No. 13/181,793.

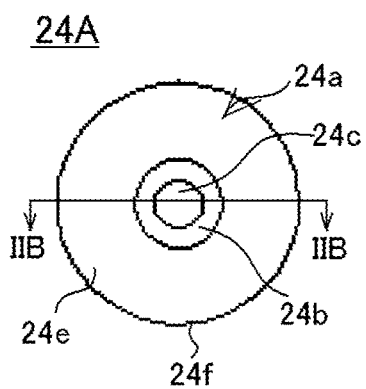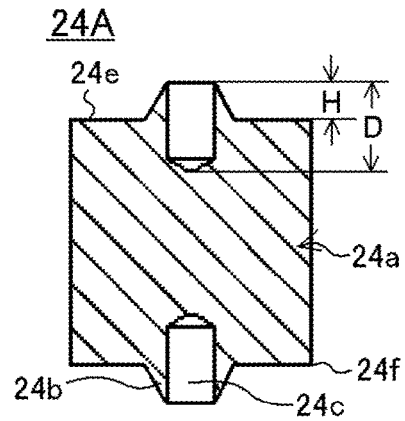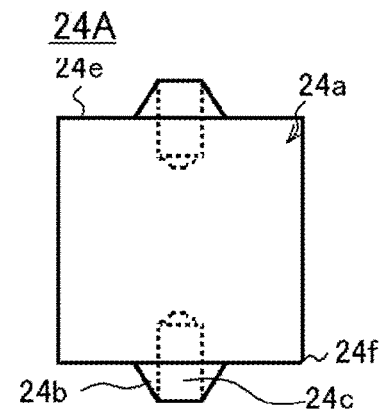
FIG.2A  FIG.2B  FIG.2C
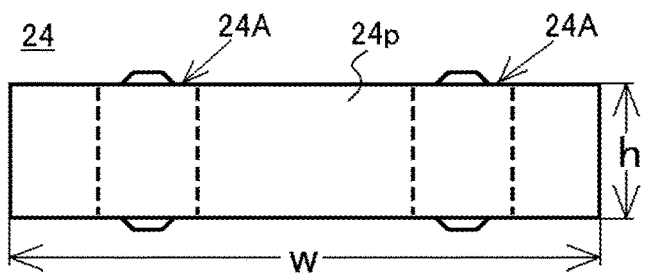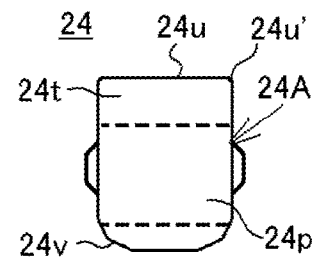
FIG.2D  FIG.2E
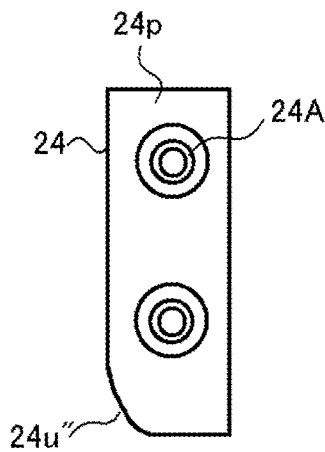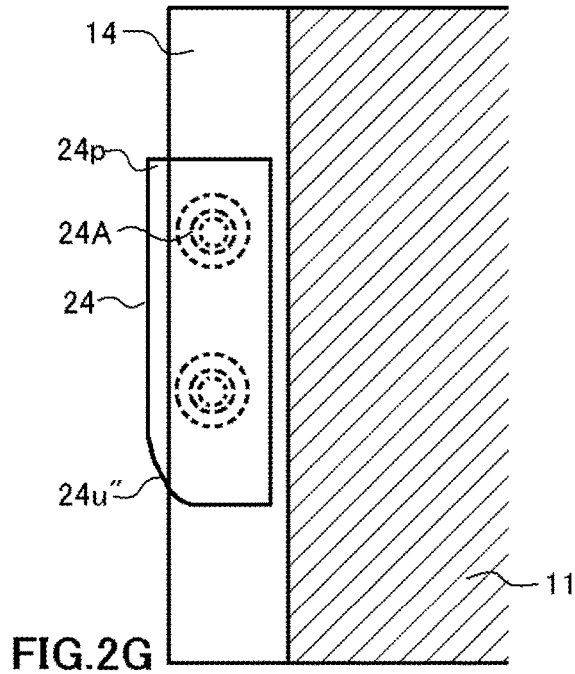
FIG.2F  FIG.2G

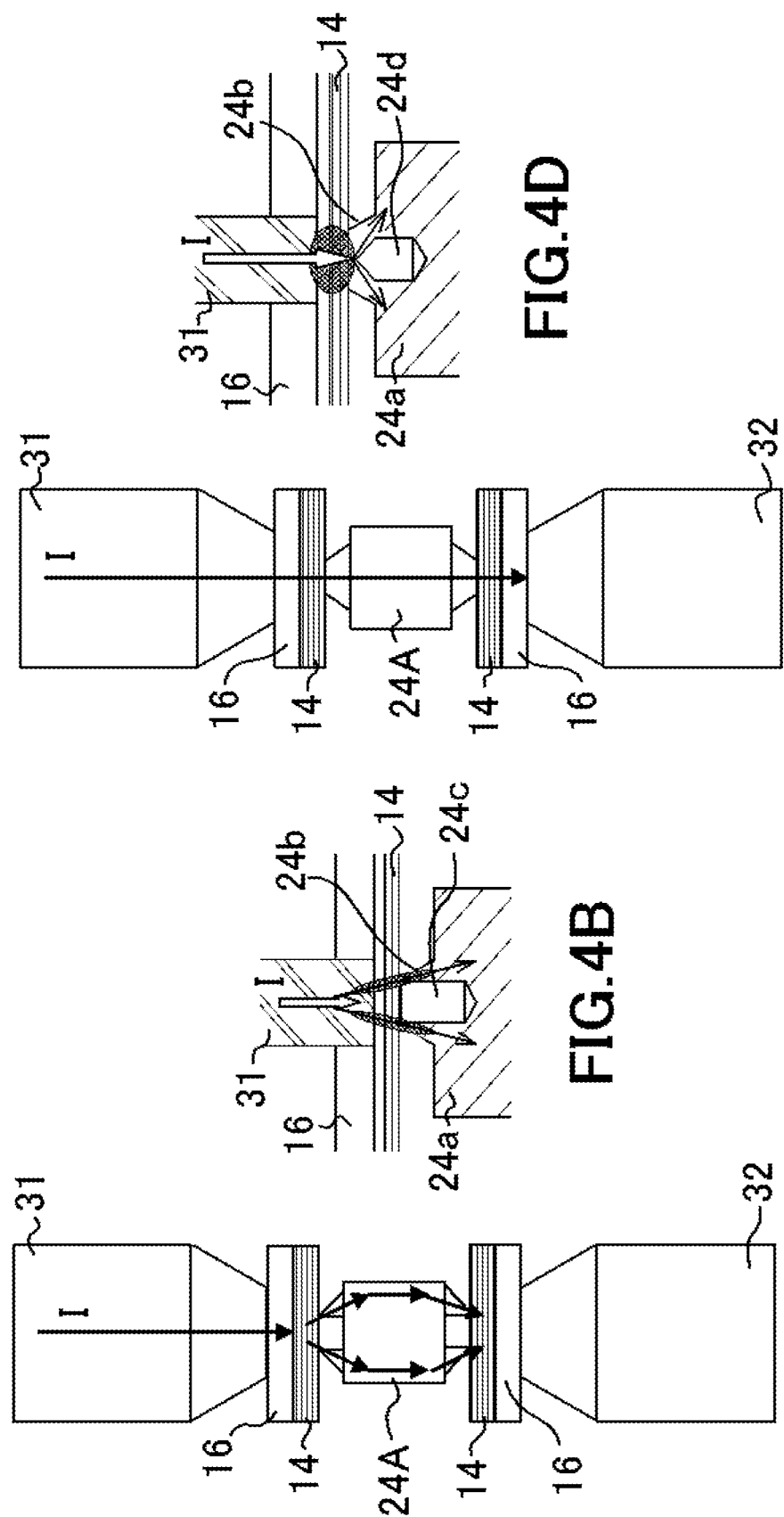

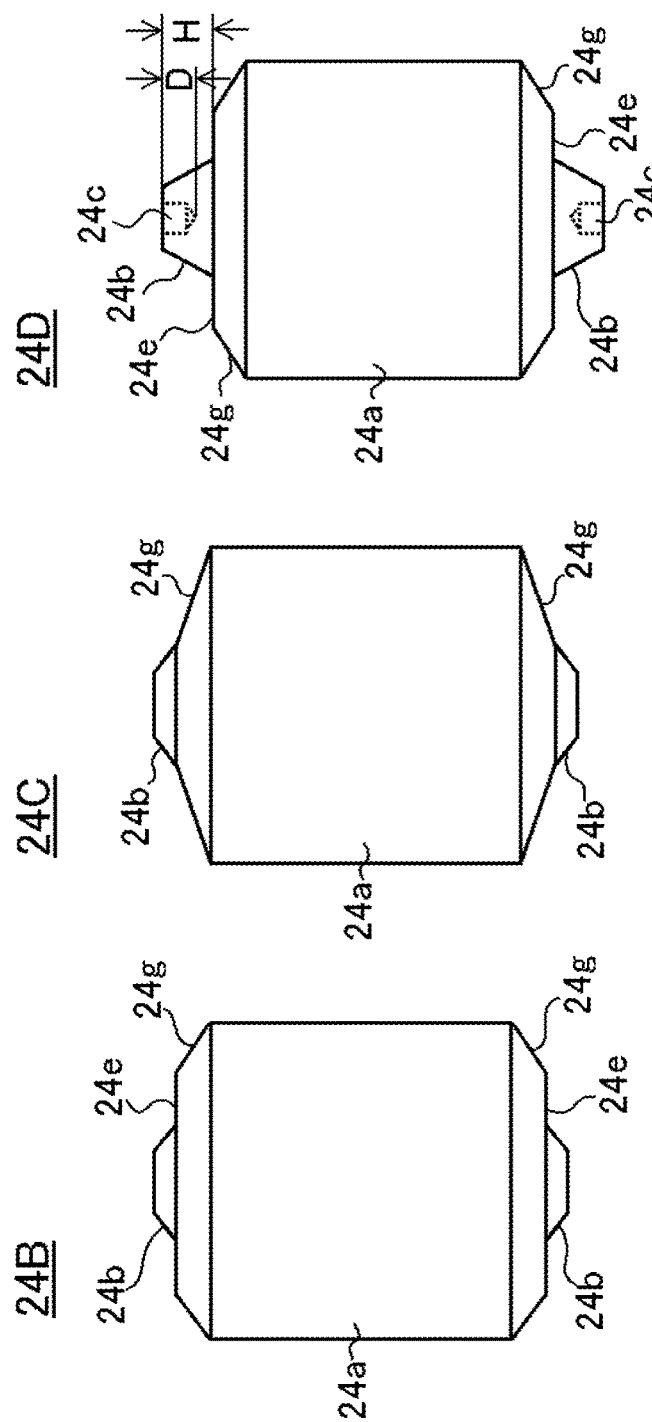

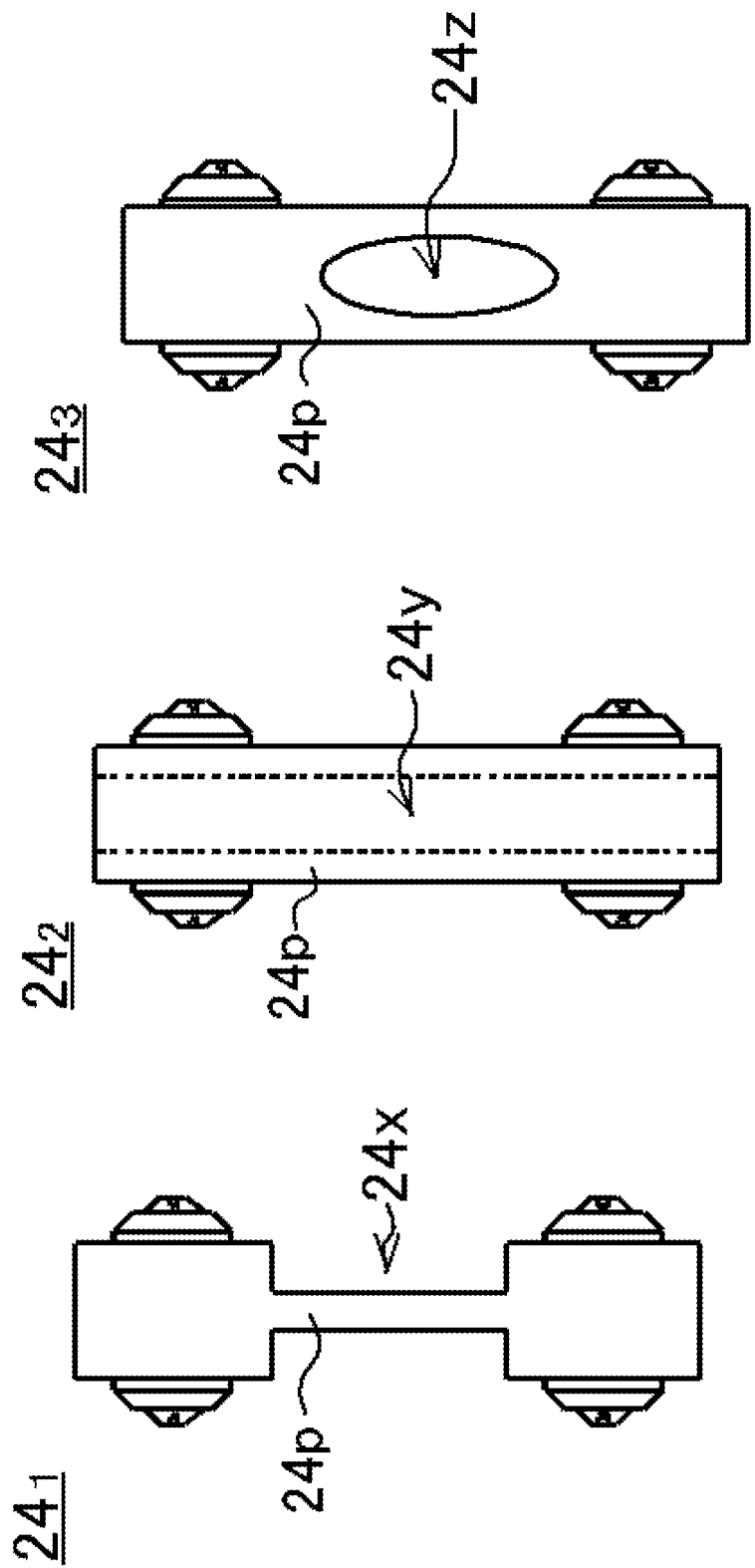

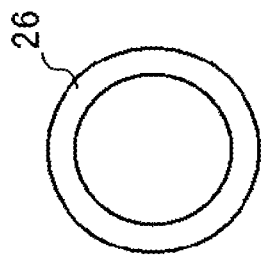
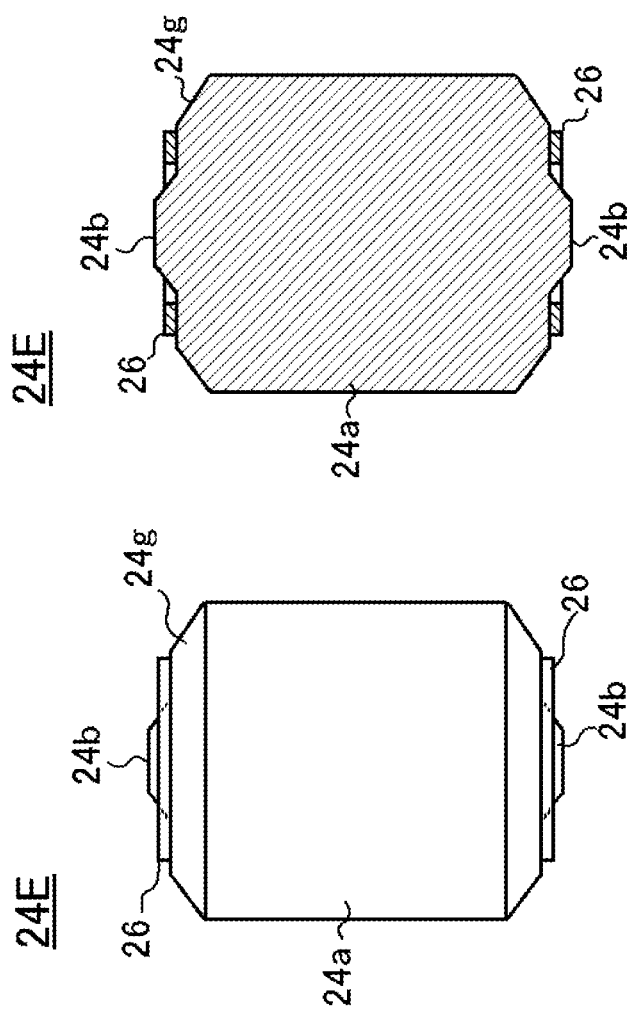
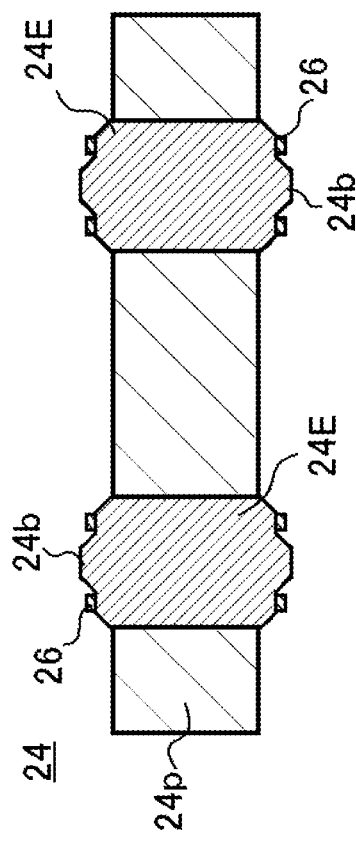

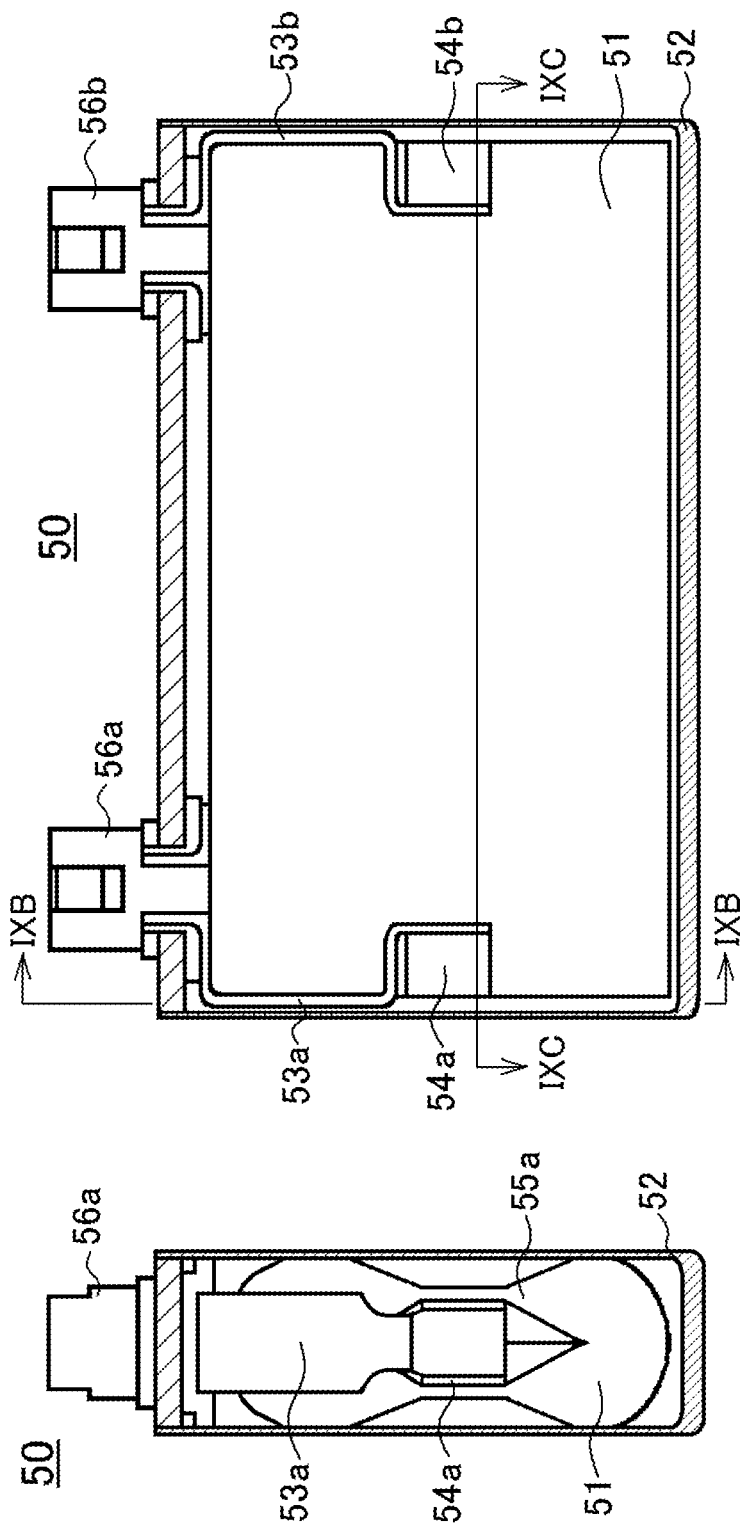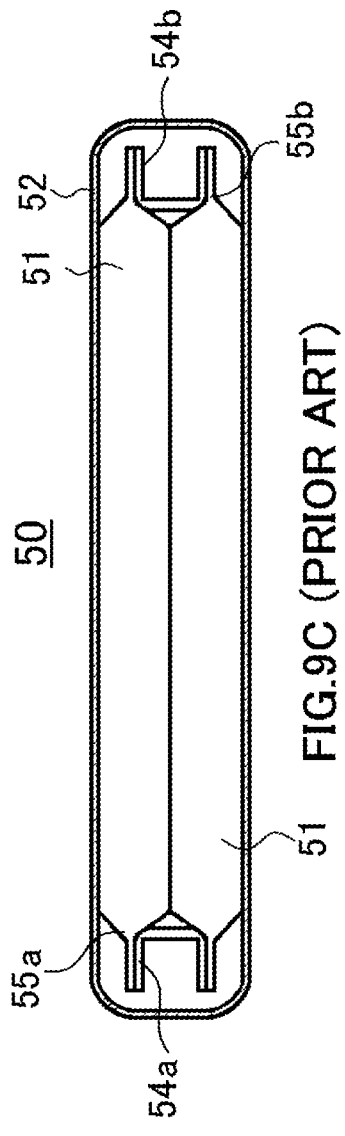
FIG.9A (PRIOR ART)
FIG.9B (PRIOR ART)
FIG.9C (PRIOR ART)

PRISMATIC SEALED SECONDARY BATTERY

This application is a continuation of U.S. application Ser. No. 14/599,007, filed on Jan. 16, 2015, which is a continuation of U.S. application Ser. No. 13/192,292, filed on Jul. 27, 2011, now U.S. Pat. No. 8,968,914 issued on Mar. 3, 2015, which claims priority to Japanese priority application No. 2010-170551 filed on Jul. 29, 2010, the entirety of both being hereby incorporated by reference.

TECHNICAL FIELD

The present invention relates to a prismatic sealed secondary battery that has stacked positive electrode substrate exposed portions and negative electrode substrate exposed portions, in which at least one of those sets of substrate exposed portions is split into two groups, connecting conductive members are positioned and disposed between such two groups, and the substrate exposed portions are resistance-welded to collector members and to the connecting conductive members, so that lowered resistance and stabilized quality of the welds are realized.

BACKGROUND ART

With the rise of the environmental protection movement over recent years, restrictions on emissions of carbon dioxide and other exhaust gases that cause warming have been strengthened. Consequently, the automobile industry is engaging actively in development of electric vehicles (EVs), hybrid electric vehicles (HEVs) and the like, to replace vehicles that use fossil fuels such as gasoline, diesel oil and natural gas. As the batteries for such EVs and HEVs, nickel-hydrogen secondary batteries or lithium ion secondary batteries are used. In recent years, nonaqueous electrolyte secondary batteries such as lithium ion secondary batteries have come to be used in large numbers for this purpose, because they provide a battery that is both lightweight and high capacity.

EVs and HEVs are now required not only to be environment-friendly, but also to have basic performance as vehicles, that is, acceleration performance, gradient-climbing performance, and other high-level driving capabilities. In order to satisfy such requirements, batteries are needed that have not simply an enhanced battery capacity but also high output. The secondary batteries widely used for EVs and HEVs usually are prismatic sealed secondary batteries in which a generation element is housed inside a prismatic outer can, and the internal resistance of such batteries must be reduced to the extent possible, because large current flows in them when high-output discharge is performed. For this reason, various improvements have been undertaken concerning lowering the internal resistance by preventing welding faults between the electrode plate substrates and the collector members in the generation element of the battery.

There exist the methods of mechanical caulking, welding, and so forth, for electrically joining the electrode plate substrates and the collector members so as to effect electrical collection in the generation element. For electrical collection in batteries that are required to have high output, welding is the appropriate method, since it is likely to realize lower resistance and unlikely to deteriorate over time. In lithium ion secondary batteries, aluminum or aluminum alloy is used as the material for the positive electrode plate substrates and collector members, and copper or copper alloy as the material for the negative electrode plate substrates and collector members to realize lower resistance. However, aluminum, aluminum alloy, copper, and copper alloy have the characteristics of low electrical resistance and high thermal conductivity, so that an extremely large amount of energy is required in order to weld them.

The following methods have long been known as methods for welding together the electrode plate substrates and collector members that constitute the generation element:
1) Laser welding
2) Ultrasonic welding
3) Resistance welding As regards the laser welding method, aluminum, aluminum alloy, copper, and copper alloy, which are the materials to be welded, have a high reflectivity of around 90% with respect to the YAG (yttrium-aluminum-garnet) laser beams that are widely used for metal welding, and therefore will require a high-energy laser beam. Additionally, with laser welding of aluminum, aluminum alloy, copper, or copper alloy, there exist the problems that the weldability varies greatly depending on influences of surface conditions, and that, as with laser welding of other materials, the occurrence of spatter is unavoidable.

With ultrasonic welding, a large energy is required because of the high thermal conductivity of aluminum, aluminum alloy, copper, and copper alloy, which are the materials to be welded, and there is also the issue that the positive electrode active material and negative electrode active material are prone to fall out due to ultrasonic vibration during the welding.

With resistance welding, furthermore, there are the issues that a large current has to be input in a short time because of the low electrical resistance and high thermal conductivity of aluminum, aluminum alloy, copper, and copper alloy, which are the materials to be welded; that there is risk of the resistance welding electrode rods becoming fusion-welded to the collector members during the resistance welding, and that melting or sparks can occur in places other than the weld portions.

The three welding methods each have their merits and drawbacks as described above. However, in the interest of productivity and economy, it is preferable to employ resistance welding, which has long been widely used as a method for welding between metals. However, the electrode assemblies in the lithium ion secondary batteries or other prismatic sealed secondary batteries used in EVs and HEVs have a structure in which positive electrode plates and negative electrode plates are stacked or wound with separators interposed therebetween. Furthermore, the substrate exposed portions of the positive electrode plates and negative electrode plates are disposed so as to be located on differing sides to each other, with the stacked positive electrode plate substrate exposed portions being welded to the positive electrode collector member, and likewise with the stacked negative electrode plate substrate exposed portions being welded to the negative electrode collector member. Where the capacity of a lithium ion secondary battery or other prismatic sealed secondary battery used for an EV or HEV is large, the number of these stacked positive electrode plate substrate exposed portions and negative electrode plate substrate exposed portions will be extremely large.

JP-A-2003-249423 discloses the invention of a storage element having an electrode assembly formed of positive electrode plates and negative electrode plates wound into a flattened shape with separators interposed therebetween, in which the substrate exposed portions of each electrode are divided into two bundles for welding to the collector member, in order to render small the stacking width of the respective electrode substrate exposed portions that project out from the separators. The structure of the storage element disclosed in JP-A-2003-249423 will now be described using FIGS. 9 and 10. FIG. 9A is a cross-sectional view of an electrical double layer capacitor that serves as the storage element disclosed in JP-A-2003-249423, FIG. 9B is a cross-sectional view along line IXB-IXB in FIG. 9A, FIG. 9C is a cross-sectional view along line IXC-IXC in FIG. 9A, and FIG. 10 is a view showing the welding process between the electrode substrate exposed portions and collector member in FIGS. 9A to 9C.

As FIGS. 9A to 9C show, the storage element 50 has a wound electrode assembly 51 in which positive electrode plates, negative electrode plates and interposed separators (all of which are not shown in the figures) are stacked and wound in a flattened shape, and this wound electrode assembly 51 is disposed inside a prismatic outer can 52 made of aluminum. The positive electrode collector member 53a and negative electrode collector member 53b of the storage element 50 have a U-shaped wing portion 54a or 54b, respectively, formed at one end and connected to the substrate exposed portions 55a of the positive electrode plates or the substrate exposed portions 55b of the negative electrode plates, respectively, with the other end being connected to the positive electrode terminal 56a or negative electrode terminal 56b, respectively. Furthermore, the substrate exposed portions 55a of the positive electrode plates are divided into two bundles, of which one is welded to one outer side face of the U-shaped wing portion 54a and the other to the other outer side face, and likewise, the substrate exposed portions 55b of the negative electrode plates are divided into two bundles, one of which is welded to one outer side face of the other U-shaped wing portion 54b and the other to the other outer side face.

For the positive electrode, for example, ultrasonic welding is performed as follows, as shown in FIG. 10. One of the two split bundles of substrate exposed portions 55a of the positive electrode plates is disposed on an outer face of the U-shaped wing portion 54a, a horn 57 of an ultrasonic welding device (not shown in the figure) is brought into contact with the outer surface of the substrate exposed portions 55a, and an anvil 58 is disposed on the inner surface of the U-shaped wing portion 54a. Note that the other bundle of the substrate exposed portions 55a of the positive electrode plates is ultrasonically welded with the same method, and likewise with the negative electrode.

In the case where the two split bundles of positive electrode plates or negative electrode plates are resistance welded, one will consider either the method of welding each bundle separately or the method of series spot welding the bundles simultaneously. Of these, the series spot welding method will be preferable in view of the smaller number of weldings. With the long-used series spot welding technique, in the case where, as shown in FIG. 11, members to be welded 73 and 74 are welded at two spots coaxially with a pair of resistance welding electrode rods 71 and 72, the method that has mainly been used is to interpose a U-shaped welding piece 75 in the intermediate space and perform the weldings at the top and bottom of the U-shaped welding piece 75. This method is in wide general use because the U-shaped welding piece 75 can be fabricated with ease from flat sheet metal and because it is easy to fabricate projections that will render the resistance welding both easy and stable.

The invention disclosed in JP-A-2003-249423 yields the advantage that a width of the positive electrode exposed portions and of the negative electrode exposed portions can be rendered small, and therefore volumetric efficiency of the storage device will be good. However, with this invention, there exist problematic aspects that will render the manufacturing equipment complex. These include the fact that several weldings are required in order to weld the positive electrode plates and the negative electrode plates to the positive electrode collector member and negative electrode collector member, respectively; and furthermore, that an open space is needed in the central portion of the wound electrode assembly in order for disposition of the welding-purpose U-shaped wing portions of the positive electrode collector member and negative electrode collector member, and that it is necessary to dispose an anvil in the interior of the U-shaped wing portions during the ultrasonic welding.

In addition, although it is stated in JP-A-2003-249423 that the ultrasonic welding method will preferably be used for the process of welding the electrode plates, a number of winding turns in the embodiments is 16 (8 for each of the two split bundles), and a stack thickness is 320 µm. As opposed to this, in large-capacity sealed batteries such as the lithium ion secondary batteries for EVs and HEVs, the number of stacked positive electrode substrate exposed portions and negative electrode substrate exposed portions is much greater than in the case of the invention disclosed in JP-A-2003-249423, and moreover the stack thickness is far larger.

Therefore, with large-capacity prismatic sealed batteries such as the lithium ion secondary batteries for EVs and HEVs, in order to use the ultrasonic welding method to weld in a stable condition the stacked positive electrode substrate exposed portions and negative electrode substrate exposed portions to the collector members, a large application of pressure is required to fit the stacked positive electrode substrate exposed portions and negative electrode substrate exposed portions tightly against their respective collector members, and a large energy is required to make the ultrasonic vibration reach as far as the other ends of the stacked positive electrode substrate exposed portions and negative electrode substrate exposed portions. With the invention disclosed in JP-A-2003-249423, the pressure application and ultrasonic energy have to be sustained by the anvil disposed in the interior of the U-shaped collector members, which means that the anvil must have considerable rigidity, and in addition it is extremely difficult in technical terms to find stable welding conditions under which an anvil of the size that can be provided in the collector member interior will sustain the large pressure application.

Furthermore, with the long-used method shown in FIG. 11, the positive electrode substrate exposed portions and negative electrode substrate exposed portions can each be series-welded with a single welding, but measures such as providing a pressure receiving piece 76 in the interior of the U-shaped welding piece 75 and/or a metal block for power conduction are needed in order to eliminate distortion of the U-shaped welding piece 75 due to pressure application by the welding electrode rods 71 and 72, and such complexification of the welding equipment has been an issue.

In JP-UM-A-58-113268 there is disclosed an electrode plate substrate yoke 80, shown in FIG. 12, in which electrode substrate groups 84a and 84b, formed by splitting into two bundled groups the substrates 84 of an electrode assembly 83, are placed against the side faces of the base portion 82 of a collector member 81 and integrally series spot-welded thereto together with a pair of stiffening plates 85a and 85b disposed on the outer sides of the electrode substrate groups 84a and 84b.

JP-A-2000-40501 discloses a flat wound electrode battery 90 that, as shown in FIGS. 13A and 13B, has a flattened wound electrode assembly 93 with positive electrode plates and negative electrode plates wound in such a manner, with separators interposed therebetween, that positive electrode substrate exposed portions 91 and negative electrode substrate exposed portions 92 are disposed on opposing sides; and in which, using for example a positive electrode terminal 94 consisting of a rectangular connecting part 94a that has edge portions made into curved surfaces and that fits into the central hollow space 91a around which the positive electrode substrate exposed portions 91 are wound, a terminal part 94b that projects longitudinally in the flattening direction, orthogonal to the winding axis direction, and a short connecting part 94c that connects such two parts, electrical connection is effected by fitting the terminal part 94b of the positive electrode terminal 94 into the central hollow space 91a around which the positive electrode substrate exposed portions 91 are wound (see FIG. 13A), then performing series spot welding on both sides of the positive electrode substrate exposed portions 91.

However, with the series spot welding methods disclosed in JP-UM-A-58-113268 and JP-A-2000-40501, the substrate exposed portions of the positive electrode plates and negative electrode plates are split into two groups and series spot welded directly to the two sides of the positive electrode terminal or negative electrode terminal, respectively, and because such welding surfaces on the positive electrode terminal or negative electrode terminal are flat surfaces, it has been difficult to render high the strength of the weldings between the positive electrode terminal or negative electrode terminal and the substrate exposed portions of the positive electrode plates or negative electrode plates, respectively, and to render small the variation in the internal resistance of the welds. In addition, there has been the issue that the positive electrode terminal and negative electrode terminal must be substantial bodies, which means that the mass of the positive electrode terminal and negative electrode terminal will be large.

In large-capacity prismatic sealed secondary batteries such as the lithium ion secondary batteries for EVs and HEVs, the number of stacked positive electrode substrate exposed portions and negative electrode substrate exposed portions is extremely large, and moreover aluminum or aluminum alloy is used for the positive electrode substrates and positive electrode collector, and copper or copper alloy for the negative electrode substrates and negative electrode collector. Since aluminum, aluminum alloy, copper and copper alloy are materials with low electrical resistance and with good thermal conductivity, it is difficult to render high the strength of the welding between the positive electrode substrate exposed portions and positive electrode terminal and between the negative electrode substrate exposed portions and negative electrode terminal, and still more difficult to render small variation in the internal resistance of the welds.

SUMMARY

An advantage of some aspects of the present invention is to provide a prismatic sealed secondary battery in which the stacked substrate exposed portions of the positive electrode or of the negative electrode, or of both, are split into two groups, a connecting conductive member is stably positioned and disposed therebetween, resistance welding is performed between the substrate exposed portions and the collector members and between the substrate exposed portions and the connecting conductive members, so that enhanced resistance of the welds can be realized, and moreover variation in the welding strength is curbed.

According to an aspect of the invention, a prismatic sealed secondary battery includes: an electrode assembly that has stacked or wound positive electrode substrate exposed portions and negative electrode substrate exposed portions; a collector member that is electrically joined to the positive electrode substrate exposed portions; a collector member that is electrically joined to the negative electrode substrate exposed portions; and a prismatic outer can into which the electrode assembly is inserted in such a manner that the positive electrode substrate exposed portions are positioned at one end, and the negative electrode substrate exposed portions at the other end, of the prismatic outer can. The positive electrode substrate exposed portions or the negative electrode substrate exposed portions, or both, are split into two groups, and therebetween is disposed an intermediate member that is made of a resin material and holds one or more connecting conductive members. The collector member for the substrate exposed portions that are split into two groups is disposed on at least one of the outermost faces of the substrate exposed portions that are split into two groups, and is electrically joined by a resistance welding method to the substrate exposed portions that are split into two groups, together with the one or more connecting conductive members of the intermediate member. The resin material portion of the intermediate member protrudes, in the extension direction of the substrate exposed portions that are split into two groups, beyond the ends of the substrate exposed portions that are split into two groups and the ends of the collector member to the prismatic outer can.

With such a prismatic sealed secondary battery of the present aspect, the intermediate member that is made of resin material and holds at least one connective conducting member is disposed between the two split groups of positive electrode substrate exposed portions, or of negative electrode substrate exposed portions, or of both. The collector member for the substrate exposed portions that are split into two groups is disposed on at least one of the outermost faces of the substrate exposed portions that are split into two groups and is electrically joined by a resistance welding method to the substrate exposed portions that are split into two groups, together with the one or more connecting conductive members of the intermediate member.

Consequently, with the prismatic sealed secondary battery of the present aspect, the substrate exposed portions that are split into two groups can be joined to the connecting conductive members and the collector member in a single operation using the series resistance welding method. In addition, when connecting conductive members are provided in plurality, because the plurality of connecting conductive members are held by the intermediate member made of resin material, the precision of the dimensions among the plurality of connecting conductive members can be improved, and moreover they can be positioned and disposed between the two split groups of substrate exposed portions in a stable state, so that the quality of the resistance welds is improved, enabling lowered resistance to be realized. For these reasons, a prismatic sealed secondary battery with raised output and lessened output variation is obtained with the present aspect of the invention.

With such a prismatic sealed secondary battery of the present aspect, the resin material portions of the intermediate member protrude, in the extension direction of the two split groups of substrate exposed portions, beyond the ends of the two split substrate exposed portions and the ends of the collector member to the prismatic outer can. Since the electrode assembly is inserted into the prismatic outer can in such a manner that the positive electrode substrate exposed portions are positioned at one end, and the negative electrode substrate exposed portions at the other end, of the prismatic outer can, in such a prismatic sealed secondary battery of the present aspect, the protruding resin material portions of the intermediate member will be positioned at the two inside ends of the prismatic outer can, thus eliminating the risk of the ends of the two split groups of substrate exposed portions and the ends of the collector member contacting with the two inside ends of the prismatic outer can. Hence, such a prismatic sealed secondary battery of the present aspect will be a highly reliable prismatic sealed secondary battery in which the risk of the positive electrode substrate exposed portions and/or the negative electrode substrate exposed portions short-circuiting with the prismatic outer can is suppressed.

Note that usually in prismatic sealed secondary batteries, the electrode assembly is wrapped in a folded-back plate-like resin sheet when inserted into the prismatic outer can, and with the prismatic sealed secondary battery of the present aspect, even if the resin sheet is mispositioned, contacting of the positive electrode substrate exposed portions and/or the negative electrode substrate exposed portions with the prismatic outer can will be reliably suppressed because the protruding resin material portions of the intermediate member will be positioned at the two inside ends of the prismatic outer can of the electrode assembly. In addition, if external force should act on the prismatic sealed secondary battery of the present aspect and deform the outer can, the possibility of the positive electrode substrate exposed portions and/or the negative electrode substrate exposed portions contacting with the prismatic outer can will be smaller than in the case where the electrode assembly is covered simply by a resin sheet, because the resin material portions of the intermediate member are rigid bodies and therefore are not likely to deform. Thus, a prismatic sealed secondary battery with high reliability can be obtained.

In addition, the resin material portion of the intermediate member is of such a size as to protrude beyond both the ends of the substrate exposed portions and the ends of the collector member when the intermediate member has been inserted between the two split groups of positive electrode substrate exposed portions and/or of negative electrode substrate exposed portions, which means that the intermediate member can be clasped at its protruding resin material portion when it is inserted between the two split groups of substrate exposed portions, thereby yielding additional advantages of facilitating insertion, facilitating the clasping of the intermediate member, and facilitating assembly.

Note that with the prismatic sealed secondary battery of the present aspect, the intermediate member, which is made of resin material, will be provided with one or more connecting conductive members, but since with one connecting conductive member the intermediate member made of resin material is prone to move rotationally with the weld point of the connecting conductive member as pivot point, the intermediate member made of resin material is preferably provided with a plurality of connecting conductive members in order to stabilize disposition of the intermediate member made of resin material and enable large-current charge/discharge. Additionally, in the prismatic sealed secondary battery of the present aspect, an intermediate member made of resin material may be disposed on the positive electrode substrate exposed portions or on the negative electrode substrate exposed portions, or on both, but will preferably be provided on both.

Note that in the present aspect of the invention, although a collector member for the two split groups of substrate exposed portions may be disposed on either or both of the outermost faces of the two split groups of substrate exposed portions, it is preferable that a collector member be disposed on both such outermost faces. However, by disposing on the other of the two outermost faces of the two split groups of substrate exposed portions a collection receiving member that is not directly connected to the electrode terminal, a functional effect can be exerted that is substantially the same as the case where a collector member is disposed on both outermost faces of the two split groups of substrate exposed portions. Hence, the meaning of "collector member" as used herein includes such a "collection receiving member".

Note further that resistance welding can be executed in a more physically stable state if a collector member is disposed on both of the outermost faces of the two split groups of substrate exposed portions. Moreover, it will be possible not to dispose anything on the other of the two outermost faces of the two split groups of substrate exposed portions, and to perform the resistance welding by bringing one of the pairs of resistance welding electrodes directly into contact with that face. However, in that case, there will be a possibility of fusion occurring between the resistance welding electrodes and the other of the two outermost faces of the two split groups of substrate exposed portions. Therefore, it will be preferable either to dispose on each of the two outermost faces of the two split groups of substrate exposed portions a collector member that is connected to the electrode terminal, or else to dispose on one of such faces a collector member connected to the electrode terminal and dispose on the other of such faces a collection receiving member that serves as a collector member.

Examples of the resin material that can be used for the intermediate member in the prismatic sealed secondary battery of the present aspect include polypropylene (PP), polyethylene (PE), polyvinylidene chloride (PVDC), polyacetal (POM), polyamide (PA), polycarbonate (PC), and polyphenylene sulfide (PPS).

In the prismatic sealed secondary battery of the present aspect, it is preferable that flat portions be provided on portions of the resin material portion of the intermediate member that are opposed to the prismatic outer can. In such a case, it is preferable that chamfered portions be formed on the angled portions of the resin material portion of the intermediate member that are opposed to the prismatic outer can.

With flat portions being provided on those portions of the resin material portion of the intermediate member that are opposed to the prismatic outer can, assembly will be easier, because by placing the flat portions of the resin material portion of the intermediate member against at least one of the two ends of the prismatic outer can during insertion of the electrode assembly into the prismatic outer can, the electrode assembly can be inserted by being slid in. Moreover, with chamfered portions being formed on the angled portions of the resin material portion of the intermediate member that are opposed to the prismatic outer can, insertion into the prismatic outer can will be easier, and furthermore, even where the electrode assembly is wrapped in a folded-back plate-like resin sheet when inserted into the prismatic outer can, ripping of the resin sheet by the angled portions of the resin material portion of the intermediate member will be suppressed.

In the prismatic sealed secondary battery of the present aspect, it is preferable that chamfered portions be formed on the angled portions of the resin material portion of the intermediate member that are on the side that is inserted into the substrate exposed portions that are split into two groups.

With chamfered portions being formed on the angled portions of the resin material portion of the intermediate member that are on the side that is inserted into the two split groups of substrate exposed portions in the prismatic sealed secondary battery of the present aspect, during insertion of the intermediate member between the stacked substrate exposed portions, the intermediate member, having the chamfered portions formed in it, will seldom cause damage to the pliable substrate exposed portions if it contacts them, and the connecting conductive members can easily be made to contact against the substrate exposed portions. As a result, the weldability will be improved.

In the prismatic sealed secondary battery of the present aspect, it is preferable that the intermediate member be provided with a gas venting hole or cutout, or both.

If the intermediate member is provided with gas venting holes or cutouts, any gas that may be generated in the electrode assembly interior in the event that abnormality occurs in the battery can easily be expelled to the exterior of the electrode assembly, and since the pressure-reduction type current interruption mechanism, gas exhaust valve, and so forth, with which a prismatic sealed battery is normally equipped will be activated stably, safety can be secured. In addition, the volume of the intermediate member will be reduced, and therefore it will be possible to render the prismatic sealed battery lighter.

In the prismatic sealed secondary battery of the present aspect, it is preferable that the connecting conductive member(s) be block-shaped or columnar body-shaped.

With the connecting conductive members being block-shaped or columnar body-shaped in the prismatic sealed secondary battery of the present aspect, deformation will be unlikely to occur when the pushing pressure is applied during resistance welding, the physical properties of the welds will be stabilized, and moreover the quality of the welds will be good. Note that shapes that are not liable to deformation, such as cylindrical columnar, square columnar, elliptical columnar, circular cylindrical, square cylindrical, or elliptical cylindrical, can be employed for the shape of the connecting conductive members.

In the prismatic sealed secondary battery of the present aspect, it is preferable that the angled portions of two mutually opposed surfaces of the block shapes or columnar body shapes have chamfered portions.

With the angled portions of two mutually opposed surfaces of the block shapes or columnar body shapes having chamfered portions in the prismatic sealed secondary battery of the present aspect, during insertion of the intermediate member between the stacked substrate exposed portions, the connecting conductive members will cause little damage to the pliable substrate exposed portions if they contact them, and the connecting conductive members can easily be made to contact against the substrate exposed portions. As a result, the weldability will be improved. Moreover, since the areas of the two opposed surfaces of the connecting conductive members become small, those surfaces will act as projections, which means that current will be concentrated and heat-up will readily take place, so that the physical properties of the welds will be stabilized, and moreover the quality of the welds will be good.

In the prismatic sealed secondary battery of the present aspect, it is preferable that the surfaces provided with the chamfered portions of the connecting conductive member(s) be planes.

The surfaces provided with the chamfered portions of the connecting conductive members can take the form either of curved surfaces or of planes. However, if the surfaces provided with the chamfered surfaces take the form of planes, then during insertion of the intermediate member between the stacked substrate exposed portions, the surfaces with chamfered angled portions and the surfaces of the intermediate member where the connecting conductive members are exposed will, of necessity, form obtuse angles with respect to the substrate exposed portions. For this reason, the substrate exposed portions and the connecting conductive members will readily come into contact when the intermediate member is inserted between the stacked substrate exposed portions and resistance welding is performed in the prismatic sealed secondary battery of the present aspect. As a result, the weldability will be improved.

The invention will be described with reference to the accompanying drawings, wherein the same numbers refer to the same elements throughout.

FIG. 1A is a cross-sectional view of a nonaqueous electrolyte secondary battery of the First Embodiment, FIG. 1B is a cross-sectional view along line IB-IB in FIG. 1A, FIG. 1C is a cross-sectional view along line IC-IC in FIG. 1A, and FIG. 1D is an enlarged view of the portion ID in FIG. 1C.

FIG. 2A is a top view of a positive electrode connecting conductive member in a First Embodiment of the invention, FIG. 2B is a cross-sectional view along line IIB-IIB in FIG. 2A, FIG. 2C is a front view of the positive electrode connecting conductive member, FIG. 2D is a front view of a positive electrode intermediate member, FIG. 2E is a side view of FIG. 2D, FIG. 2F is a top view of a modification in which a chamfered position in the positive electrode intermediate member is modified, and FIG. 2G is a top view showing a state in which the positive electrode intermediate member in FIG. 2F is mounted on an electrode assembly.

FIG. 3 is a side view showing the welding conditions pertaining to the First Embodiment.

FIG. 4A is a view showing the route by which the resistance welding current flows in the case where the portion of the protrusion that contacts with the positive electrode substrate exposed portions is annular, FIG. 4B is a view showing the portions in FIG. 4A where heat-up is intense, FIG. 4C is a view showing the route by which the resistance welding current flows in the case where the portion of the protrusion that contacts with the positive electrode substrate exposed portions is circular, and FIG. 4D is a view showing the portions in FIG. 4C where heat-up is intense.

FIGS. 5A to 5C are schematic views showing the shape of the positive electrode connecting conductive member pertaining to Second to Fourth Embodiments, respectively, of the invention, and FIG. 5D is a schematic side view showing the positive electrode intermediate member of the Fourth Embodiment in the state where it has been installed to the positive electrode substrate exposed portions, which are split into two groups.

FIGS. 7A to 7C are front views showing the shape of the positive electrode intermediate member in Seventh to Ninth Embodiments, respectively, of the invention.

FIG. 8A is a front view of the positive electrode connecting conductive member in a Tenth Embodiment of the invention, FIG. 8B is a longitudinal sectional view through FIG. 8A, FIG. 8C is a top view of the ring-shaped insulating seal material, and FIG. 8D is a longitudinal sectional view of the positive electrode intermediate member in the Tenth Embodiment.

FIG. 9A is a cross-sectional view of an electrical double layer capacitor which serves as a storage element in the related art, FIG. 9B is a cross-sectional view along line IXB-IXB in FIG. 9A, FIG. 9C is a cross-sectional view along line IXC-IXC in FIG. 9A.

DESCRIPTION OF EXEMPLARY EMBODIMENTS

Preferred embodiments for carrying out the invention will now be described in detail with reference to the accompanying drawings. However, it should be remembered that the various embodiments set forth below are intended by way of examples for understanding the technical concepts of the invention, and not by way of limiting the invention to these particular prismatic sealed secondary batteries. The invention can equally well be applied to produce many different variants of the embodiments without departing from the scope and spirit of the technical concepts set forth in the claims. Note that although the invention is applicable to a flattened battery that uses a generation element, a plurality of positive electrode substrate exposed portions formed at one end and a plurality of negative electrode substrate exposed portions formed at the other end, which can be made either by stacking or by winding positive electrode plates and negative electrode plates with separators interposed therebetween, the embodiment descriptions below use flattened wound electrode assemblies as representative examples.

First Embodiment

Figure 1A:
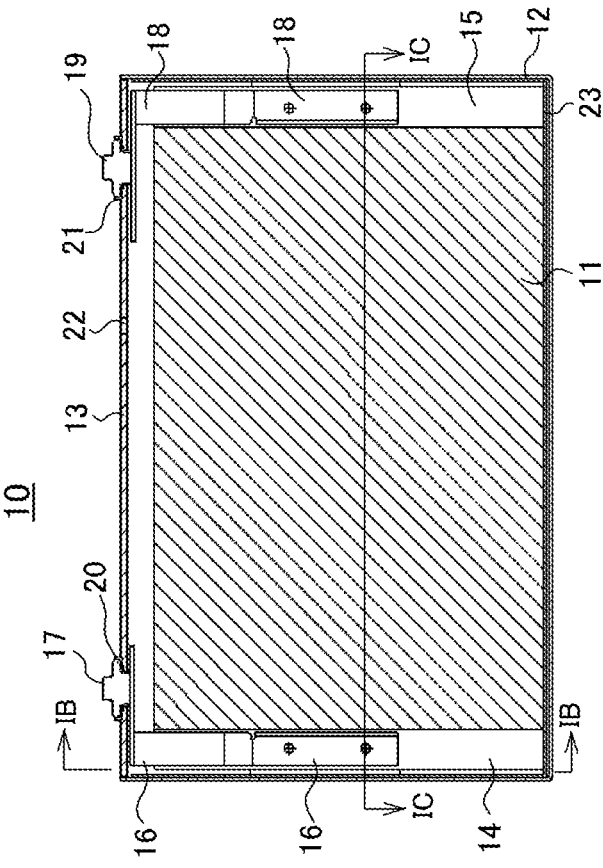
Figure 1B:
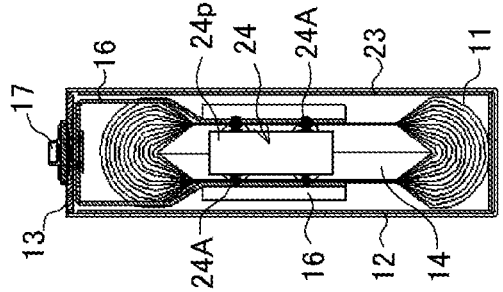
Figure 1C:
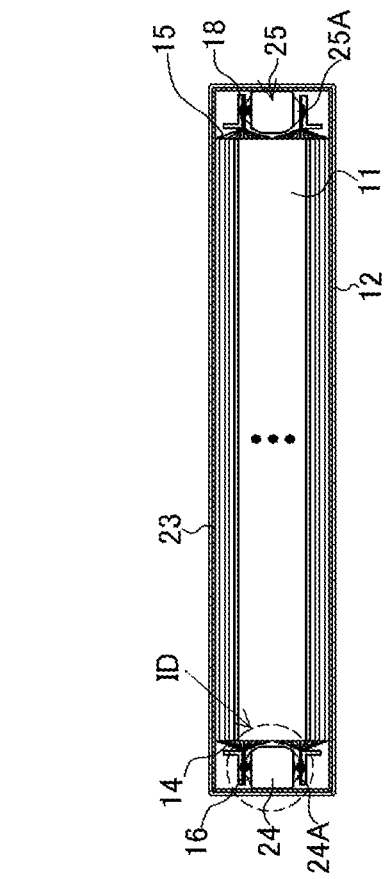
Figure 1D:
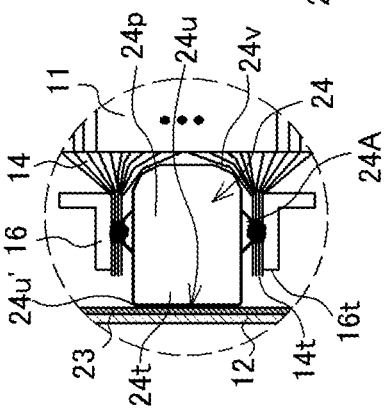
Figure 3:
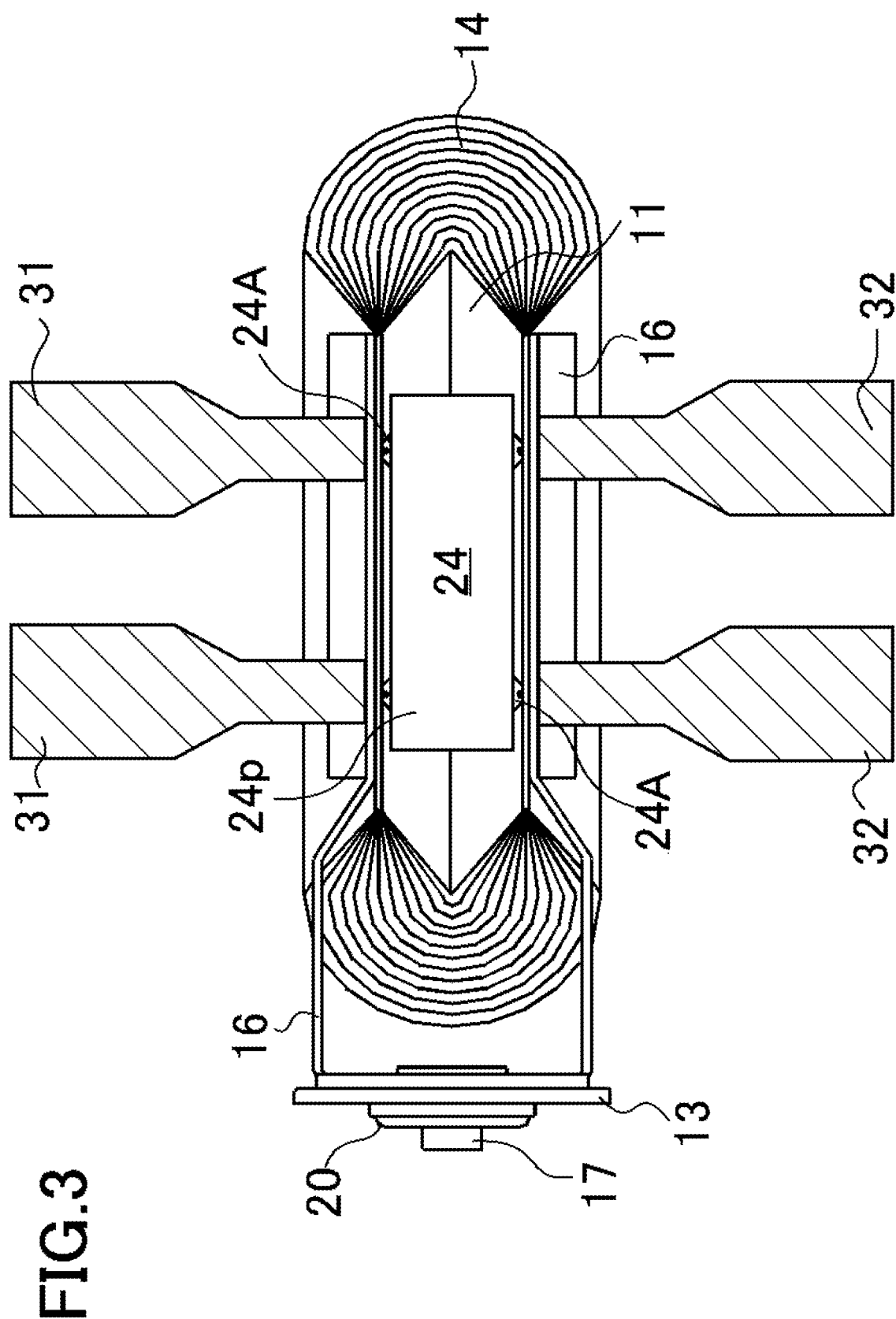

First of all, as an example of a prismatic sealed secondary battery of a First Embodiment of the invention, a prismatic nonaqueous electrolyte secondary battery will be described using FIGS. 1 to 3. FIG. 1A is a cross-sectional view of a nonaqueous electrolyte secondary battery of the First Embodiment, FIG. 1B is a cross-sectional view along line IB-IB in FIG. 1A, FIG. 1C is a cross-sectional view along line IC-IC in FIG. 1A, and FIG. 1D is an enlarged view of the portion ID in FIG. 1C. FIG. 2A is a top view of a positive electrode connecting conductive member in the First Embodiment, FIG. 2B is a cross-sectional view along line IIB-IIB in FIG. 2A, FIG. 2C is a front view of the positive electrode connecting conductive member, FIG. 2D is a front view of a positive electrode intermediate member, FIG. 2E is a side view of FIG. 2D, FIG. 2F is a top view of a modification in which a chamfered position in the positive electrode intermediate member is modified, and FIG. 2G is a top view showing a state in which the positive electrode intermediate member in FIG. 2F is mounted on an electrode assembly. FIG. 3 is a side view showing the welding conditions pertaining to the First Embodiment.

This nonaqueous electrolyte secondary battery 10 has a flattened wound electrode assembly 11 in which positive electrode plates and negative electrode plates are wound with separators interposed therebetween (all of these are not shown in the figures). The positive electrode plates are fabricated by spreading positive electrode active material mixture over both faces of a positive electrode substrate constituted of aluminum foil, drying such mixture and rolling the resulting plate, then slitting the plate so that a strip of aluminum foil is exposed. Likewise, the negative electrode plates are fabricated by spreading negative electrode active material mixture over both faces of a negative electrode substrate constituted of copper foil, drying such mixture and rolling the resulting plate, then slitting the plate so that a strip of copper foil is exposed.

Next, the positive electrode plates and negative electrode plates thus obtained are displaced so that the aluminum foil exposed portions of the positive electrode plates do not overlie the active material layer of one of the opposed electrodes, and the copper foil exposed portions of the negative electrode plates do not overlie the active material layer of the other opposed electrode, and are then wound with polyethylene porous separators interposed therebetween, to produce a flattened wound electrode assembly 11 that has a plurality of positive electrode substrate exposed portions 14 piled one above another at one end in the winding axis direction, and a plurality of negative electrode substrate exposed portions 15 piled one above the other at the other end.

The plurality of positive electrode substrate exposed portions 14 are stacked and connected via positive electrode collector members 16 to a positive electrode terminal 17, and likewise the plurality of negative electrode substrate exposed portions 15 are stacked and connected via negative electrode collector members 18 to a negative electrode terminal 19. Note that the positive electrode terminal 17 and the negative electrode terminal 19 are each fixed to a sealing plate 13 with an insulating member 20, 21 respectively, interposed. To fabricate this prismatic nonaqueous electrolyte secondary battery 10 of the First Embodiment, the flattened wound electrode assembly 11 fabricated in the foregoing manner is inserted, with an insulating resin sheet 23 interposed all around except for the sealing plate 13 edge, into a prismatic outer can 12, after which the sealing plate 13 is laser-welded to the mouth portion of the outer can 12, then nonaqueous electrolyte is poured in through an electrolyte pour hole 22, and the electrolyte pour hole 22 is sealed over.

In the positive electrode part of the flattened wound electrode assembly 11, as shown in FIGS. 1B and 1C, the stacked plurality of positive electrode substrate exposed portions 14 are split into two groups, between which is sandwiched a positive electrode intermediate member 24 that is constituted of resin material and holds one or more (two in this example) positive electrode connecting conductive members 24A. Likewise in the negative electrode part, the stacked plurality of negative electrode substrate exposed portions 15 are split into two groups, between which is sandwiched a negative electrode intermediate member 25 that is constituted of resin material and holds two negative electrode connecting conductive members 25A. Also, on each of the two outermost surfaces of the positive electrode substrate exposed portions 14, located at the two sides of the positive electrode connecting conductive members 24A, there is disposed a positive electrode collector member 16, and on each of the two outermost surfaces of the negative electrode substrate exposed portions 15, located at the two sides of the negative electrode connecting conductive members 25A, there is disposed a negative electrode collector member 18. Specific structures and features of the positive electrode intermediate member 24, the negative electrode intermediate member 25, the positive electrode connecting conductive members 24A, and the negative electrode connecting conductive members 25A will be described in greater detail later.

Note that the positive electrode connecting conductive members 24A are made of the same material, namely, aluminum, as the positive electrode substrates, and the negative electrode connecting conductive members 25A are made of the same material, namely, copper, as the negative electrode substrates, but the shapes of the positive electrode connecting conductive members 24A and the negative electrode connecting conductive members 25A may either be the same or differ. Examples of the resin material that can be used for the positive electrode intermediate member 24 and the negative electrode intermediate member 25 are synthetic resins such as polypropylene (PP), polyethylene (PE), polyvinylidene chloride (PVDC), polyacetal (POM), polyamide (PA), polycarbonate (PC), and polyphenylene sulfide (PPS).

Note that in the nonaqueous electrolyte secondary battery 10 of the First Embodiment, as FIGS. 1A, 1B and 2D show, the positive electrode intermediate member 24 and the negative electrode intermediate member 25 hold two positive electrode connecting conductive members 24A or negative electrode connecting conductive members 25A, respectively, as an example, but the number of positive electrode connecting conductive members 24A or negative electrode connecting conductive members 25A that is provided may alternatively, depending on the battery output, for example, that is required, be one, or be three or more. In particular, when a plurality of connecting conductive members are provided in an intermediate member, the fact that all of the connecting conductive members are held by one intermediate member that is made of resin material will mean that the precision of the dimensions among the connecting conductive members can be improved, and moreover that they can be positioned and disposed between the two split groups of substrate exposed portions in a stable state.

Resistance welding is performed both between these positive electrode collector members 16 and the positive electrode substrate exposed portions 14, and between the positive electrode substrate exposed portions 14 and the positive electrode connecting conductive members 24A (at four places in each case, see FIG. 1B). Likewise, connection is effected, by resistance welding, between the negative electrode collector members 18 and the negative electrode substrate exposed portions 15, and between the negative electrode substrate exposed portions 15 and the negative electrode connecting conductive members 25A (at four places in each case).

Detailed descriptions will now be given, using FIGS. 2 and 3, of the specific manufacturing method for the flattened wound electrode assembly 11, together with the resistance welding method using the positive electrode substrate exposed portions 14, the positive electrode collector members 16 and the positive electrode intermediate member 24 having positive electrode connecting conductive members 24A, and of the resistance welding method using the negative electrode substrate exposed portions 15, the negative electrode collector members 18 and the negative electrode intermediate member 25 having negative electrode connecting conductive members 25A. Since, however, the shapes of the positive electrode connecting conductive members 24A and positive electrode intermediate member 24 can be substantially identical with those of the negative electrode connecting conductive members 25A and negative electrode intermediate member 25, and moreover since the resistance welding methods in both cases are substantially similar, the descriptions below use the positive electrode plate items as representative examples.

First of all, the positive electrode substrate exposed portions 14 of the flattened wound electrode assembly 11, which had been obtained by displacing the positive electrode plates and negative electrode plates so that the aluminum foil exposed portions of the positive electrode plates did not overlie the active material layer of one of the opposed electrodes, and the copper foil exposed portions of the negative electrode plates did not overlie the active material layer of the other opposed electrode, then winding the electrode plates with polyethylene porous separators interposed therebetween, were split into two groups, one on either side from the central portion of the winding, and each group of positive electrode substrate exposed portions 14 was bundled centered on ¼ of the electrode assembly thickness. The thickness of the aluminum foil bundle in each group is approximately 660 μm, and the total number of stacked foils is 88 (44 in each group). The positive electrode collector members 16 are fabricated by punching and bend-processing, etc., an 0.8-mm thick aluminum sheet. Note that the positive electrode collector members 16 may alternatively be fabricated by casting, etc., from aluminum sheet.

Then the positive electrode collector members 16 and the positive electrode intermediate member 24 having positive electrode connecting conductive members 24A are inserted between the two split groups of positive electrode substrate exposed portions 14, with the positive electrode collector members 16 being inserted onto the two outermost surfaces of the positive electrode substrate exposed portions 14 and the positive electrode intermediate member 24 being inserted into the inner periphery thereof, in such a manner that truncated cone shaped protrusions 24b of the positive electrode intermediate member 24 each contact against the positive electrode substrate exposed portions 14.

There follows an explication, using FIGS. 2A to 2G, of the shape of the positive electrode connecting conductive members 24A held by the positive electrode intermediate member 24 in the First Embodiment. In these positive electrode connecting conductive members 24A, a protrusion 24b with, e.g., a truncated cone shape is formed on each of two opposed faces 24e of the cylindrical columnar main body 24a. In the central portion of this truncated cone-shaped protrusion 24b there is formed an aperture 24c extending from the tip into the interior of the cylindrical columnar main body 24a. Angled portions 24f are formed between the two opposed faces 24e and the side surfaces of the cylindrical columnar main body 24a.

It is desirable that the height H of the truncated cone-shaped protrusion 24b be comparable with that of protrusions (projections) that are ordinarily formed on resistance welding members, that is, several mm or so. As regards the depth D of the aperture 24c, which in the present example is larger than the height of the truncated cone-shaped protrusion 24b, the aperture 24c will preferably be formed from a face 24e, where the protrusion 24b is formed, of the cylindrical columnar main body 24a, as far as a position located inward to a distance less than the height H of the protrusion 24b (with the depth D of the aperture 24c being less than 2H), or more preferably, as far as a position located inward to a distance less than ½ of the height H of the protrusion 24b from the surface of the cylindrical columnar main body 24a where the protrusion 24b is provided (with the depth D of the aperture 24c being less than 3/2 H).

It is desirable that the diameter and length of the cylindrical columnar main body 24a be on the order of three mm to several tens of mm, though these dimensions will vary with the flattened wound electrode assembly 11, outer can 12, and other parts (see FIGS. 1A to 1D). Note that although the shape of the main body 24a of the positive electrode connecting conductive members 24A is described here as cylindrical columnar, any desired shape that has the form of a metallic block, such as square columnar or elliptical columnar can be used. Also, as the material for forming the positive electrode connecting conductive members 24A, copper, copper alloy, aluminum, aluminum alloy, tungsten, molybdenum, or the like, can be used. Furthermore, variants of such items constituted of such metals can be used, by for example applying nickel plating to the protrusion 24b, or changing the material of the protrusion 24b and its base area to tungsten or molybdenum, which promotes heat emissions, and joining it by brazing, for example, to the main body 24a of the positive electrode connecting conductive members 24A constituted of copper, copper alloy, aluminum, or aluminum alloy.

Note that in the First Embodiment, there are two positive electrode connecting conductive members 24A, which are held integrally by the positive electrode intermediate member 24 that is made of resin material. In such a case, the plurality of positive electrode connecting conductive members 24A are held in such a manner as all to be parallel to each other. The shape of the positive electrode intermediate member 24 can take any square columnar, elliptical columnar, or like form, that is desired, but is configured to have a horizontally long square columnar form in order to be stably positioned and fixed in the positive electrode substrate exposed portions 14 split into two groups.

The length w of the square columnar positive electrode intermediate member 24 will vary with the size of the prismatic nonaqueous electrolyte secondary battery, but can be on the order of 20 mm to several tens of mm. As for the width h, although it is desirable that this be roughly the same as the height of the positive electrode connecting conductive members 24A, but it will suffice if at least the two ends of the positive electrode connecting conductive members 24A that will become welds are exposed. Note that the two ends of the positive electrode connecting conductive members 24A will preferably protrude from the surface of the positive electrode intermediate member 24, but that they do not necessarily need to do so.

As FIG. 1D shows, in the resin material portion 24p of the positive electrode intermediate member 24, there is formed, in the extension direction of the two split groups of positive electrode substrate exposed portions 14, a protruding portion 24t that protrudes beyond the ends 14t of the two split groups of positive electrode substrate exposed portions 14 and ends 16t of the positive electrode collector members 16 toward the prismatic outer can 12. With such a structure being employed, the protruding portion 24t of the resin material portion 24p of the positive electrode intermediate member 24 will be positioned at least one of the ends of the flattened wound electrode assembly 11, which are positioned at the inside ends of the prismatic outer can 12, and so the risk of the ends 14t of the two split groups of positive electrode substrate exposed portions 14 and the ends 16t of the positive electrode collector members 16 both contacting with the inside of the prismatic outer can 12 will be eliminated.

Moreover, since the protruding portion 24t of the resin material portion 24p of the positive electrode intermediate member 24 protrudes beyond the ends 14t of the substrate exposed portions 14 and the ends 16t of the collector members 16 when inserted between the two split groups of positive electrode substrate exposed portions 14, the positive electrode intermediate member 24 can be clasped at the protruding portion 24t when being inserted between the two split groups of positive electrode substrate exposed portions 14, thereby facilitating the insertion.

The flattened wound electrode assembly 11 will be usually wrapped in a folded-back plate-like resin sheet 23 when inserted into the prismatic outer can 12, and thanks to the presence of the protruding portion 24t of the resin material portion 24p of the positive electrode intermediate member 24, even if the resin sheet 23 is mispositioned, contacting of the ends 14t of the positive electrode substrate exposed portions 14 and the ends 16t of the positive electrode collector members 16 with the prismatic outer can 12 will be reliably suppressed. If external force should act on the prismatic sealed battery 10 and deform the prismatic outer can 12, the possibility of the ends 14t of the positive electrode substrate exposed portions 14 and the ends 16t of the positive electrode collector members 16 contacting with the prismatic outer can 12 will be smaller than in the case where the electrode assembly 11 is covered simply by the resin sheet 23, because, unlike the resin sheet 23, the resin material portion 24p of the positive electrode intermediate member 24 is a rigid body and therefore is not likely to deform.

Furthermore, a flat portion 24u is formed on that portion of the protruding portion 24t of the resin material portion 24p of the positive electrode intermediate member 24 that is opposed to the prismatic outer can 12, and chamfered portions 24u' are formed on longitudinal angled portions of the flat portion 24u. With such a structure provided, assembly will be easier, because by placing the flat portion 24u of the protruding portion 24t of the resin material portion 24p of the positive electrode intermediate member 24 against at least one of the ends of the prismatic outer can 12 during insertion of the flattened electrode assembly 11 into the prismatic outer can 12, the electrode assembly 11 can be inserted by being slid in. Moreover, with chamfered portions 24u' being formed on the longitudinal angled portions of the flat portion 24u of the protruding portion 24t of the resin material portion 24p of the positive electrode intermediate member 24, insertion into the prismatic outer can 12 will be easier, and furthermore, even where the flattened electrode assembly 11 is wrapped in a folded-back plate-like resin sheet 23 when inserted into the prismatic outer can 12, ripping of the resin sheet 23 by the angled portions of the protruding portion 24t of the resin material portion 24p of the positive electrode intermediate member 24 will be suppressed.

In the resin material portion 24p of the positive electrode intermediate member 24 that is used in the First Embodiment, chamfered portions 24v are formed on the angled portions of the side that is inserted into the two split groups of positive electrode substrate exposed portions 14. With such a structure provided, during insertion of the positive electrode intermediate member 24 between the two split groups of stacked positive electrode substrate exposed portions 14, the chamfered portions 24v of the positive electrode intermediate member 24 will cause little damage to the positive electrode substrate exposed portions 14 if they contact them, and the positive electrode connecting conductive members 24A can be made to contact against the inner face of the split groups of positive electrode substrate exposed portions 14 when the positive electrode intermediate member 24 is inserted between the two split groups of positive electrode substrate exposed portions 14.

Note that in the foregoing First Embodiment, chamfered portions 24u' formed on the longitudinal angled portions of the flat portion 24u of the protruding portion 24t of the resin material portion 24p of the positive electrode intermediate member 24 were described as an example, but as a variant of that, chamfered portions 24u" could be formed on the widthwise angled portions of the flat portion 24u on the side of the protruding portion 24t of the resin material portion 24p of the positive electrode intermediate member 24 that is opposed to the bottom of the prismatic outer can 12. With such a structure, the state when the positive electrode intermediate member 24 has been inserted into the two split groups of positive electrode substrate exposed portions 14 will be that shown in FIG. 2G, and so when, after resistance welding, the electrode assembly 11 with the positive electrode intermediate member 24 installed thereto is inserted into the prismatic outer can 12, even if wrapped in a folded-back plate-like resin sheet 23, the electrode assembly 11 can be inserted more smoothly into the prismatic outer can 12.

Next, as shown in FIG. 3, the flattened wound electrode assembly 11, with the positive electrode collector members 16 and the positive electrode intermediate member 24 holding the positive electrode connecting conductive members 24A disposed therein, is disposed between pairs of resistance welding electrode rods 31 and 32 above and below, and the pairs of resistance welding electrode rods 31 and 32 are each brought into contact with one of the positive electrode collector members 16, which are disposed on the outermost two surfaces of the positive electrode substrate exposed portions 14. Then an appropriate degree of pressure is applied between the pairs of resistance welding electrode rods 31 and 32, and resistance welding is performed under particular predetermined conditions.

In this resistance welding, the positive electrode intermediate member 24 is disposed in a stably positioned state between the two split groups of positive electrode substrate exposed portions 14, and so it is possible, using just one set of pairs of resistance welding electrode rods 31 and 32, to resistance-weld a plurality of positive electrode connecting conductive member 24A portions one by one, or, using multiple sets of pairs of resistance welding electrode rods 31 and 32, to resistance-weld a plurality of positive electrode connecting conductive member 24A portions two or more at a time. With this positive electrode intermediate member 24 being used in the First Embodiment, the dimensional precision between the connecting conductive members 24A and the electrode rods 31 and 32 is enhanced, which means that the resistance welding can be done in an accurate and stable state, and variation in the welding strength will be curbed.

Note that because an aperture 24c is formed in the protrusion 24b of the positive electrode connecting conductive members 24A in the First Embodiment, the current will readily concentrate at the tip of the protrusion 24b and furthermore the tip of the protrusion 24b will readily bite into the positive electrode substrate exposed portions 14. Thus, the weldability is improved over the case where no aperture 24c is formed. Moreover, the resistance welding is carried out with the pressure being applied so that the tip of the protrusion 24b is semi-crushed and the portion of the protrusion 24b that contacts with the positive electrode substrate exposed portions 14 changes from annular to circular, then it will be possible to perform the welding more stably.

Thus, it is preferable that, for example as shown in FIG. 4D, the shape of the protrusion 24b of the positive electrode connecting conductive members 24A be made such that the tip of the protrusion 24b is semi-crushed and the portion of the protrusion 24b that contacts with the positive electrode substrate exposed portions 14 changes from annular to circular. In such a case, a hollow 24d will be formed in the interior of the protrusion 24b. This will make the portion of the protrusion 24b that contacts with the positive electrode substrate exposed portions 14 into a circular shape, thereby promoting the emission of heat from the center of the positive electrode connecting conductive member 24A, enabling further stabilized welding.

Note that whether the portion of the protrusion 24b that contacts with the positive electrode substrate exposed portions 14 is semi-crushed or is annular is known to depend mainly on the pressure applied during welding. The tendency is for the protrusion tip to be annular when the welding applied pressure is weak, and to be semi-crushed when the welding applied pressure is strong. Besides that, it is considered that the larger the height of the protrusion 24b and the larger the depth of the aperture 24c, the more readily will the portion be semi-crushed; when the aperture's depth is small, the tip of the protrusion 24b will more readily retain its annular shape and be in a condition to bite into the substrate exposed portions.

During the resistance welding, it is preferable that the central axes of the pairs of resistance welding electrode rods 31 and 32 coincide with those of the positive electrode connecting conductive members 24A, and that the positive electrode connecting conductive members 24A be held in such a manner that they will not come out of position due to the pressure application, etc. In addition, a semiconductor type welding power source using commonly-known transistors or the like can be used as the resistance welding machine.

There follows an explanation, using FIGS. 4A to 4D, of the reasons for the difference arising in the heat-up conditions when the portion of the protrusion 24b that contacts with the positive electrode substrate exposed portions 14 is annular and when it is circular. FIG. 4A is a view showing the route by which the resistance welding current flows in the case where the portion of the protrusion 24b that contacts with the positive electrode substrate exposed portions 14 is annular, FIG. 4B is a view showing the portions in FIG. 4A where heat-up is intense, FIG. 4C is a view showing the route by which the resistance welding current flows in the case where the portion of the protrusion 24b that contacts with the positive electrode substrate exposed portions 14 is circular, and FIG. 4D is a view showing the portions in FIG. 4C where heat-up is intense.

Since the current flows through the places with smallest resistance, the portion of the interior of the resistance welding electrode rods 31 and 32 where the current flows the most is its center. In the case where the portion of the protrusion 24b that contacts with the positive electrode substrate exposed portions 14 is annular, the welding current I will, for example, flow from the upper resistance welding electrode rod 31 through the upper positive electrode collector member 16 and positive electrode substrate exposed portions 14 into the annular tip of the upper protrusion 24b of the positive electrode connecting conductive member 24A, where the current is split up into an annular stream, which flows through the interior of the main body 24a of the positive electrode connecting conductive member 24A and into the annular tip of the lower protrusion 24b of the positive electrode connecting conductive member 24A, where the current is focused, and then flows though the lower positive electrode substrate exposed portions 14 and positive electrode collector member 16 into the lower resistance welding electrode rod 32, as shown in FIG. 4A. Therefore, in the case where the portion of the protrusions 24b that contacts with the positive electrode substrate exposed portions 14 is annular, the current will not flow in the center of the protrusions 24b, and as a result, the welding start points will occur in an annular configuration, and there will be multiple start points as shown in FIG. 4B.

By contrast, in the case where the portion of the protrusions 24b that contacts with the positive electrode substrate exposed portions 14 has been semi-crushed and become circular, a hollow 24d will be formed in the interior of the protrusion 24b, and as a result, the welding current I will, for example, flow from the upper resistance welding electrode rod 31 through the upper positive electrode collector member 16 and positive electrode substrate exposed portions 14 and into the center of the circular tip of the upper protrusion 24b of the positive electrode connecting conductive member 24A, where the current is split up into an annular stream, which flows through the interior of the main body 24a of the positive electrode connecting conductive member 24A and into the center of the circular tip of the lower protrusion 24b of the positive electrode connecting conductive member 24A, where the current is focused, and then flows though the lower positive electrode substrate exposed portions 14 and positive electrode collector member 16 into the lower resistance welding electrode rod 32, as shown in FIG. 4C.

In this example, at the protrusion 24b portion the welding current I avoids the hollow 24d and is split up into an annular stream, but since the hollow 24d is present in the central interior of the circular tip, the heat absorption that accompanies the melting of metal is lessened, and so the area around the center of the circular tip of the protrusion 24b becomes the place that heats up most readily. Therefore, in the case where the portion of the protrusions 24b that contacts with the positive electrode substrate exposed portions 14 is circular, the current will be focused in the center of the circular tip of the protrusion 24b, and so the shape of the portion that heats up intensely due to the welding current I will be spherical, as shown in FIG. 4D, which means that the welded state will be more stable and moreover the welding strength will be high.

Note that the foregoing First Embodiment described an example in which the positive electrode connecting conductive members 24A have a columnar main body 24a and truncated cone-shaped protrusions 24b in which apertures 24c are formed. However, with the invention it is possible to use protrusions 24b in which no apertures are formed, or that are truncated pyramid-shaped, more precisely, truncated triangular or quadrangular truncated pyramid-shaped, or even multiangular truncated pyramid-shaped.

In the case where no apertures are formed in the protrusions 24b, the effect of the protrusions 24b will be similar to that of the long-used projections used during resistance welding. Even in this case, however, it will be possible to carry out resistance welding satisfactorily between the positive electrode collector member 16, the stacked plurality of positive electrode substrate exposed portions 14 and the positive electrode connecting conductive members 24A. Where the depth of the apertures 24c formed in the protrusions 24b is small, the effects arising during resistance welding will gradually approach those when no apertures are formed in the protrusions 24b.

Although an example has been described in which items having a circular main body 24a were used as the positive electrode connecting conductive members 24A, any item having the form of a metallic block, such as square cylindrical, elliptical cylindrical, or the like shape, will be suitable, and it will further be possible to use an item in which the aperture 24c (see FIGS. 2A to 2G) penetrates fully through the main body 24a. Particularly in the case where the aperture 24c penetrates fully through the main body 24a, the main body 24a of the positive electrode connecting conductive members 24A will be cylindrical, but in such a case the main body 24a can be made to also serve as protrusions by forming the two ends thereof or leaving them projecting. In such a case where the main body 24a of the positive electrode connecting conductive members 24A is cylindrical, it will be advisable to make the cylindrical portion thicker to a certain degree, in order to render the electrical resistance small.

The foregoing First Embodiment described the case where the stacked plurality of positive electrode substrate exposed portions 14 are split into two groups and resistance welding is performed using the positive electrode collector members 16 and the positive electrode connecting conductive members 24A, but alternatively the positive electrode connecting conductive members 24A could be made to also serve as positive electrode collector members, and be connected to the positive electrode terminal 17. In such a case it will suffice to employ, in place of the positive electrode collector members used in the First Embodiment, a welding receiving member constituted of thin sheet material formed from the same material as the positive electrode connecting conductive members 24A.

Second to Fourth Embodiments

The First Embodiment described, for the positive electrode connecting conductive members 24A that are held by the positive electrode intermediate member 24, an item in which a protrusion 24b that is, e.g., truncated pyramid-shaped, is formed on each of two opposed faces 24e of the cylindrical columnar main body 24a, as shown in FIGS. 2A to 2C. Thus, when the main body 24a is cylindrical columnar, angled portions 24f will be formed between the two opposed faces 24e and side faces of the cylindrical columnar main body 24a. Therefore, as shown in FIG. 3, when the positive electrode intermediate member 24 holding the positive electrode connecting conductive members 24A is disposed inside the two split groups of stacked positive electrode substrate exposed portions 14, so that each of the truncated pyramid-shaped protrusions 24b on the two ends of the positive electrode connecting conductive members 24A contacts against the stacked positive electrode substrate exposed portions 14, then if the angled portions 24f protrude exposed from the surface of the positive electrode intermediate member 24, the exposed angled portions 24f will more readily contact with the stacked positive electrode substrate exposed portions 14, and the positive electrode substrate exposed portions 14 will readily deform.

Accordingly, for the positive electrode connecting conductive member 24B of a Second Embodiment of the invention, surfaces 24g provided with chamfered portions are formed on the angled portions 24*f* between the two opposed faces 24*e* and side faces of the cylindrical columnar main body 24*a* of the First Embodiment. This positive electrode connecting conductive member 24B of the Second Embodiment will now be described using FIG. 5A. Note that FIG. 5A is a front view of a positive electrode connecting conductive member 24B of the Second Embodiment.

With the positive electrode connecting conductive member 24B of the Second Embodiment, which has surfaces 24*g* provided with chamfered portions as mentioned above, even if the surfaces 24*g* provided with chamfered portions protrude from the surface of the positive electrode intermediate member 24, when the positive electrode intermediate member 24 holding the positive electrode connecting conductive members 24B is disposed inside the two split groups of stacked positive electrode substrate exposed portions 14, so that each of the truncated cone-shaped protrusions 24*b* on the two ends of the positive electrode connecting conductive members 24B contacts against the stacked positive electrode substrate exposed portions 14, little damage will be caused to the stacked positive electrode substrate exposed portions 14, and insertion as far as the position for welding to the positive electrode substrate exposed portions 14 will be easy. Hence, the weldability will be improved.

Either curved surfaces or planes can be employed for the surfaces 24*g* provided with chamfered portions of the positive electrode connecting conductive members 24B of the Second Embodiment. However, if the surfaces 24*g* provided with chamfered portions are made into planes, then the surfaces 24*g* provided with chamfered portions and the surfaces on which the protrusion 24*b* is formed will, of necessity, form obtuse angles with respect to the positive electrode substrate exposed portions 14, and so the positive electrode substrate exposed portions 14 and the protrusions 24*b* will readily come into contact when the positive electrode connecting conductive members 24B is brought into contact with the stacked positive electrode substrate exposed portions 14, with the result that the weldability will be improved.

As regards the positive electrode connecting conductive members 24C of a Third Embodiment of the invention, as shown in FIG. 5B, these positive electrode connecting conductive members 24C exhibit a form such that the surfaces 24*g* provided with chamfered portions are extended as far as the portion where the protrusion 24*b* is formed, and the faces 24*e* constituted of the two mutually parallel planar faces on the main body 24*a* of the positive electrode connecting conductive members 24B of the Second Embodiment are absent. These positive electrode connecting conductive members 24C of the Third Embodiment will also yield fairly good resistance welding advantages.

However, the configuration with the two faces 24*e* where the protrusion 24*b* is provided both being exposed, as in the positive electrode connecting conductive members 24B of the Second Embodiment is used, more precisely, the configuration whereby two mutually parallel planar faces are formed on the main body 24*a* of the positive electrode connecting conductive members 24B, is more preferable, because when the pressure is applied to the resistance welding electrode during resistance welding, the positive electrode connecting conductive members 24B will not be prone to deform, and part of the protrusion 24*b* that melts and deforms, or part of the positive electrode substrate exposed portions 14 that melt, during resistance welding, will dwell on these surfaces 24*e* and be inhibited from flowing out toward the sides of the positive electrode connecting conductive members 24B, and moreover, since the faces 24*e* will be the faces that contact with the positive electrode substrate exposed portions 14, the positions of the positive electrode connecting conductive members 24B will be stabilized, and it will be possible to obtain higher-reliability resistance welds.

Furthermore, the positive electrode connecting conductive members 24D of a Fourth Embodiment of the invention are the positive electrode connecting conductive members 24B of the Second Embodiment, but provided, in the central portion of the protrusions 24*b*, with apertures 24*c* having a depth D that is smaller than the height H of the protrusions 24*b*.

FIG. 5D is a schematic side view that illustrates resistance welding carried out using the positive electrode connecting conductive members 24D of the Fourth Embodiment in order to show that when the surfaces 24*g* provided with chamfered portions are formed, as in the positive electrode connecting conductive members 24B to 24D of the Second to Fourth Embodiments, the positive electrode intermediate member 24 can more readily be inserted between the two split groups of positive electrode substrate exposed portions 14. It will be seen from FIG. 5D that even with the positive electrode connecting conductive members 24D protruding from the surface of the positive electrode intermediate member 24, the positive electrode substrate exposed portions 14 will not be prone to deform geometrically. FIG. 5D also illustrates the case where the angled portions on the side of the positive electrode intermediate member 24 that is inserted between the positive electrode substrate exposed portions 14 are chamfered. It will also be seen from FIG. 5D that due to the shape of the positive electrode intermediate member 24, the positive electrode substrate exposed portions 14 will not be prone to deform geometrically even when the positive electrode intermediate member 24 is inserted between the two split groups of positive electrode substrate exposed portions 14.

Fifth and Sixth Embodiments

In the First to Fourth Embodiments above, examples were described in which the positive electrode substrate exposed portions 14 of the flattened wound electrode assembly 11 are split into two groups, one on each side relative to the winding center portion, each such group is bundled together, positive electrode collector members 16 are placed against the two outermost surfaces of the positive electrode substrate exposed portions 14, a positive electrode intermediate member 24 having positive electrode connecting conductive members 24A, 24B, 24C or 24D is inserted between the two split groups of positive electrode substrate exposed portions 14, and resistance welding is performed by bringing pairs of resistance welding electrodes 31, 32 into contact with both surfaces of the positive electrode collector members 16 (see FIG. 3). However, with the present invention, it is not necessarily a necessary condition to place positive electrode collector members 16 connected to the positive electrode terminal 17 against both of the outermost surfaces of the two split groups of positive electrode substrate exposed portions 14; it will suffice to perform resistance welding with positive electrode collector members 16 placed against at least one surface of the two split groups of positive electrode substrate exposed portions 14.

Figure 6A:
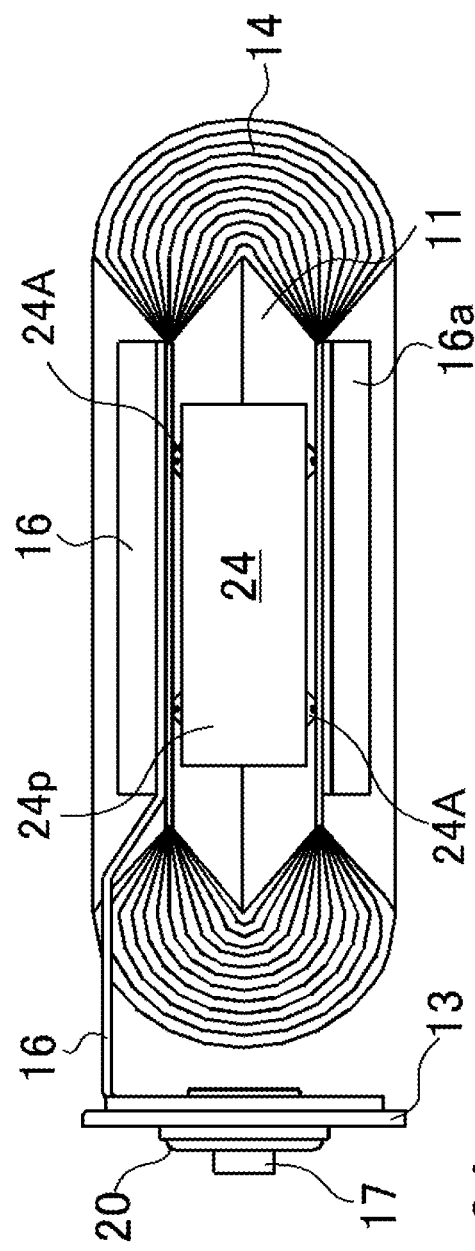
FIG. 6A is a side view showing the post-welding disposition of the positive electrode connecting conductive member portion in a Fifth Embodiment of the invention.
Figure 6B:
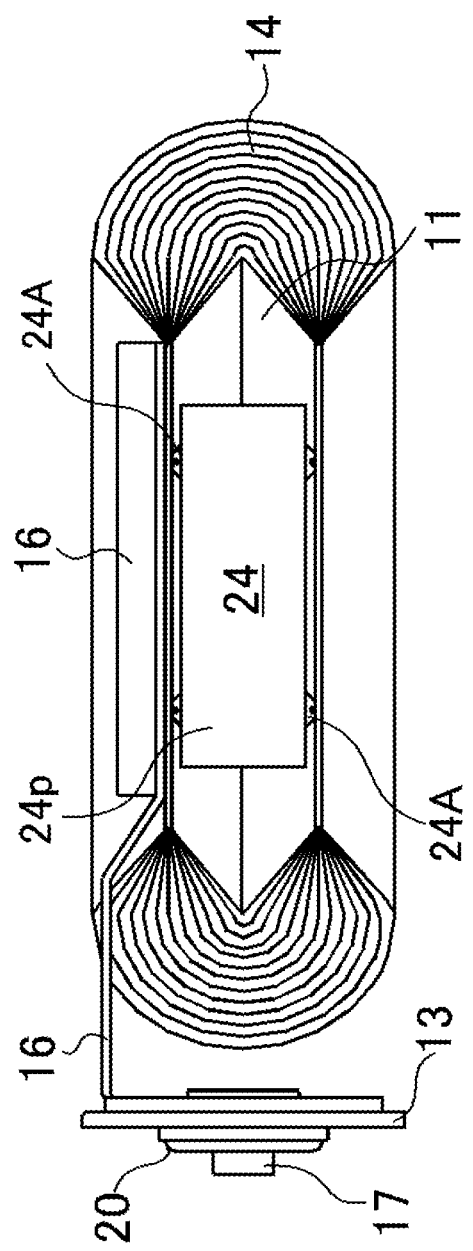
FIG. 6B is a side view showing the post-welding disposition of the positive electrode connecting conductive member portion in a Sixth Embodiment of the invention.
Figure 10:
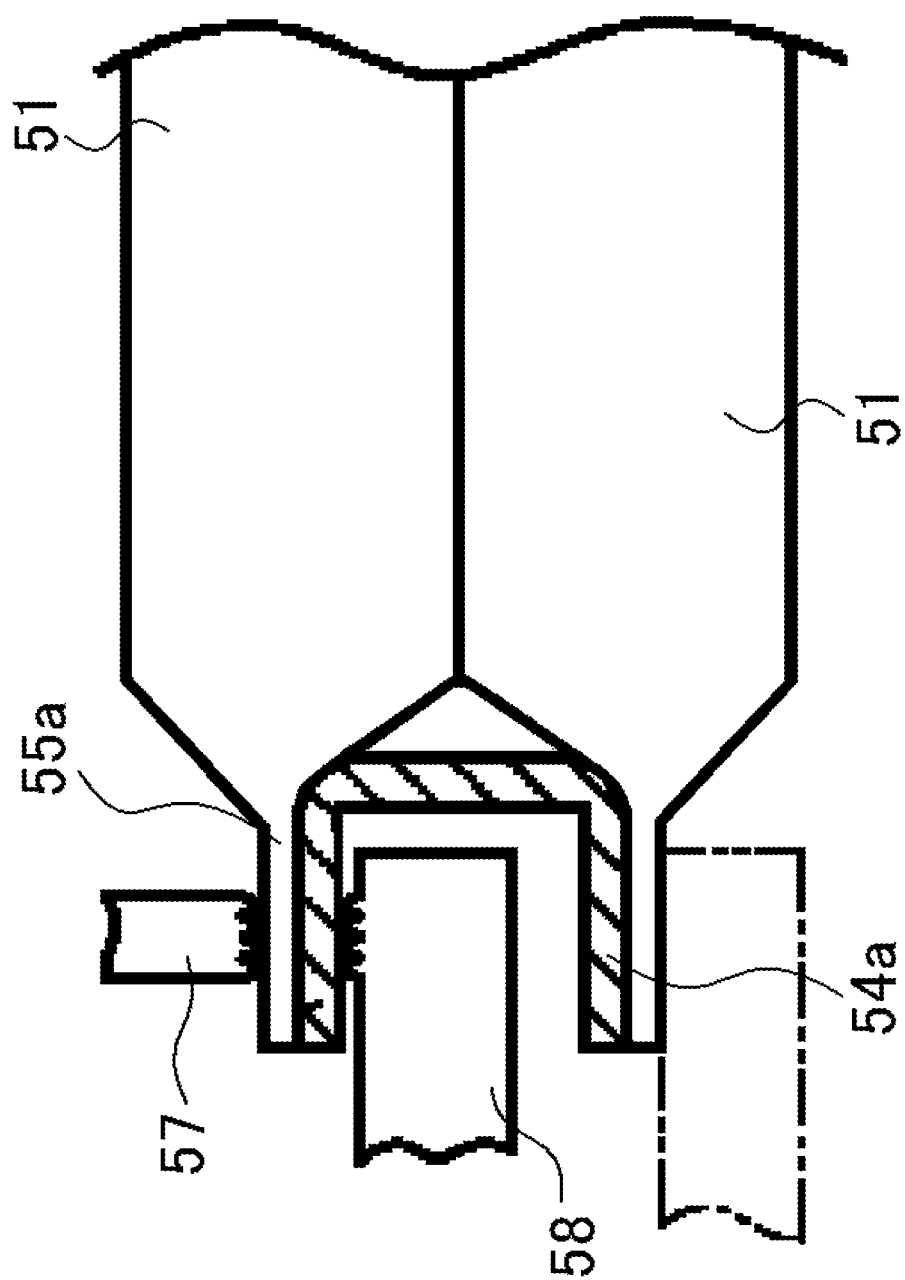
FIG. 10 is a view showing the welding process between the electrode substrate exposed portion and collector member in FIGS. 9A to 9C.
Figure 11:
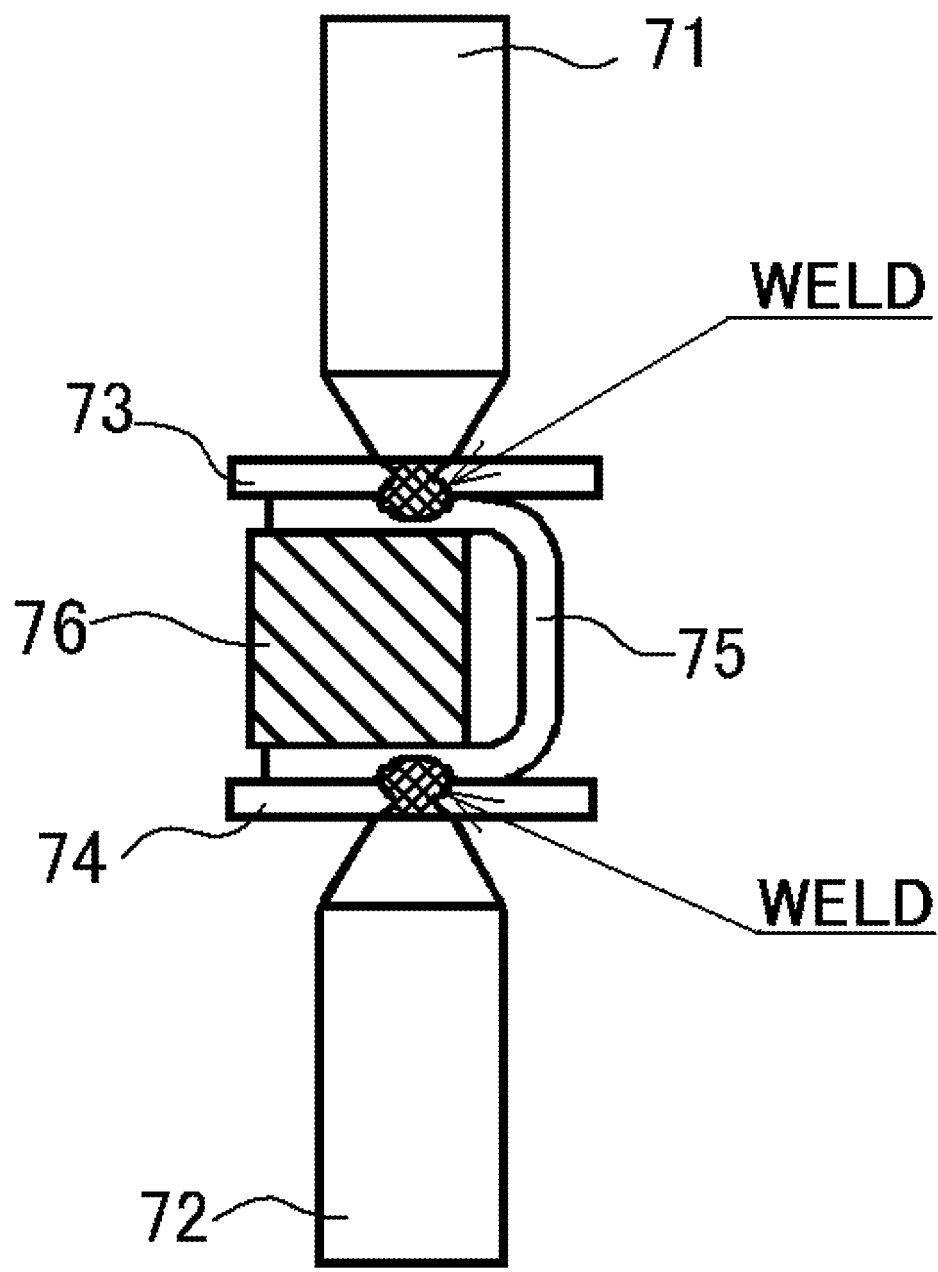
FIG. 11 is a view explicating the series spot welding method that has long been in use.
Figure 12:
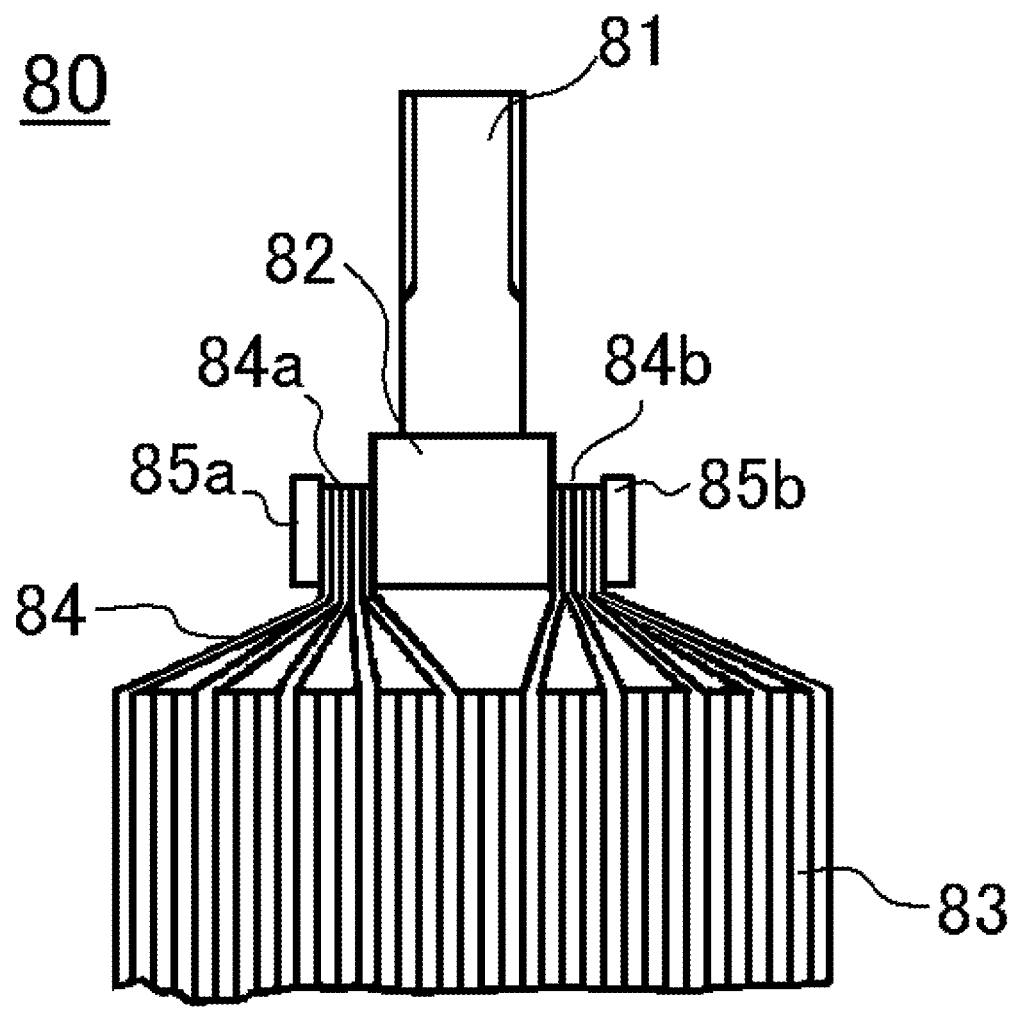
FIG. 12 is a cross-sectional view of an electrode plate substrate yoke that has been welded with the series spot welding method that has long been in use.
Figure 13B:
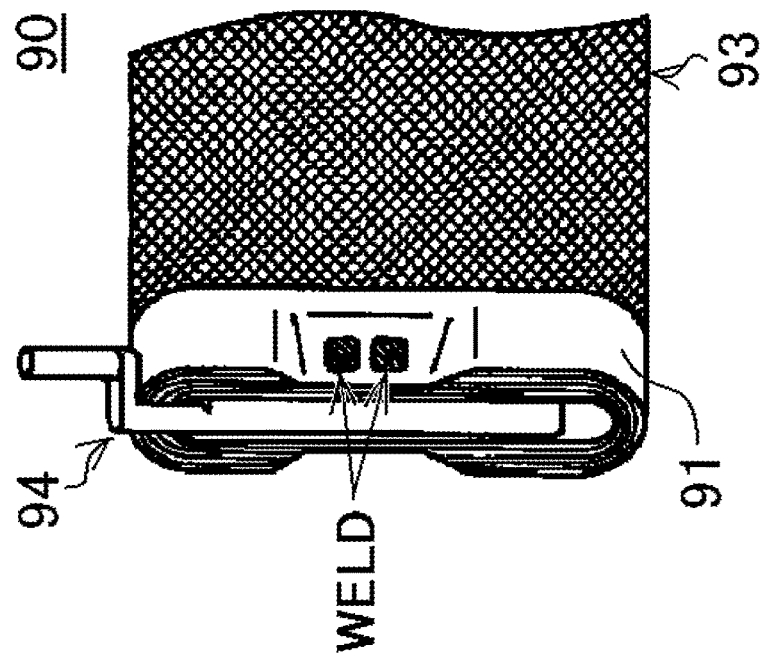
FIG. 13B is a perspective view of those items in the post-welding state.
Figure 13A:
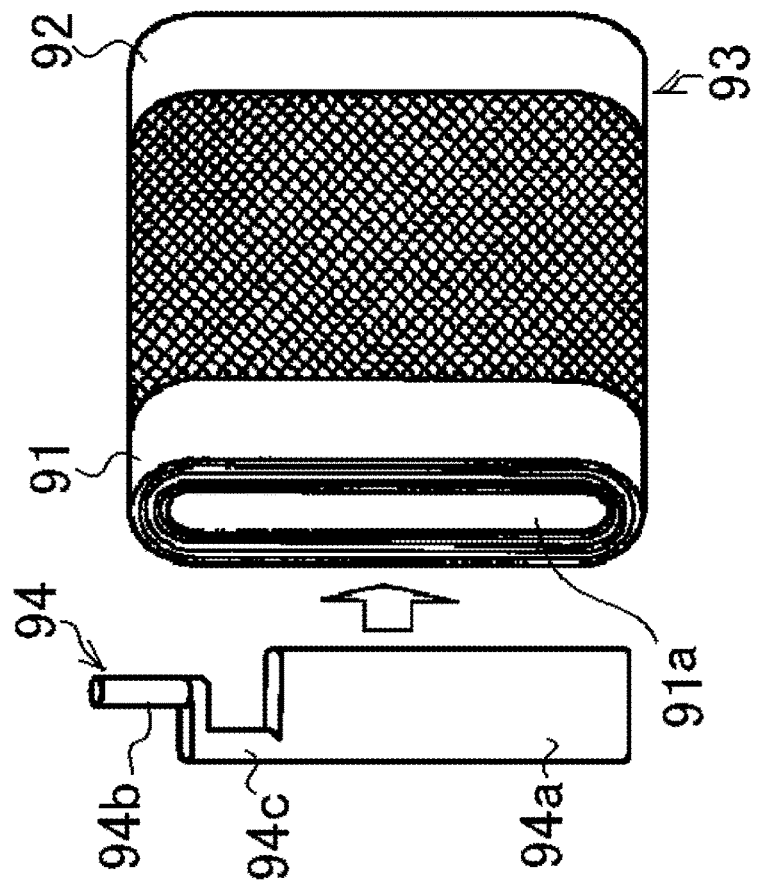
FIG. 13A is an exploded perspective view of a positive electrode terminal and positive electrode substrate exposed portions in the pre-welding state in another example of the related art.

There follows a description, using FIGS. 6A and 6B, of the post-welding disposition of the positive electrode connecting conductive member 24 portion in Fifth and Sixth Embodiments of the invention, in which, as mentioned above, positive electrode collector members 16 connected to the positive electrode terminal 17 are placed against at least one surface of the two split groups of positive electrode substrate exposed portions 14. Note that FIG. 6A is a side view showing the post-welding disposition of the positive electrode connecting conductive member 24 portion in the Fifth Embodiment, and FIG. 6B is a side view showing the post-welding disposition of the positive electrode connecting conductive member 24 portion in the Sixth Embodiment. The descriptions of the Fifth and Sixth Embodiments use positive electrode intermediate members 24 that have the same positive electrode connecting conductive members 24A as the items used in the First Embodiment.

In the Fifth Embodiment, as shown in FIG. 6A, a positive electrode collector member 16 connected to the positive electrode terminal 17 is disposed so as to contact against one outermost surface of the two split groups of positive electrode substrate exposed portions 14, a positive electrode collection receiving member 16a is disposed so as to contact against the other outermost surface of the two split groups of positive electrode substrate exposed portions 14, and resistance welding is performed by placing pairs of resistance welding electrodes into contact with the positive electrode collector member 16 and the positive electrode collection receiving member 16a. In this Fifth Embodiment, the positive electrode collection receiving member 16a is not directly connected to the positive electrode terminal 17, but fulfills the role of receiving one of the pairs of resistance welding electrodes during resistance welding. Even with a structure such as in the Fifth Embodiment, substantially the same advantageous effects are yielded as in the First Embodiment, because of the projection effect possessed by the positive electrode connecting conductive members 24A of the positive electrode intermediate member 24. More precisely, the collection receiving member 16a yields substantially the same advantageous effects as the positive electrode collector member 16 with regard to resistance welding. The meaning of "collector member" as used herein includes such a "collection receiving member". Disposing collector members on both the outermost surfaces of the two split groups of positive electrode substrate exposed portions 14 enables resistance welding to be performed in a physically stable state.

In the Sixth Embodiment, as shown in FIG. 6B, a positive electrode collector member 16 is disposed so as to contact against one outermost surface of the two split groups of positive electrode substrate exposed portions 14, nothing is provided on the other outermost surface of the two split groups of positive electrode substrate exposed portions 14, and resistance welding is performed by placing pairs of resistance welding electrodes into contact with the positive electrode collector member 16 and the other outermost surface of the two split groups of positive electrode substrate exposed portions 14. More precisely, in the Sixth Embodiment, one of the pair of resistance welding electrodes is placed directly into contact with the other outermost surface of the two split groups of positive electrode substrate exposed portions 14 in order to perform resistance welding. With a configuration such as in the Sixth Embodiment, fairly good resistance welding can be performed because of the projection effect possessed by the positive electrode connecting conductive members 24A of the positive electrode intermediate member 24, but since there is a possibility of fusion occurring between the resistance welding electrodes and the other outermost surface of the positive electrode substrate exposed portions 14, it is preferable that a positive electrode collector member 16 or a collection receiving member 16a be disposed on the other outermost surface of the positive electrode substrate exposed portions 14, as in the First to Fifth Embodiments.

Seventh to Tenth Embodiments

In the First Embodiment, an example was described that used a positive electrode intermediate member 24 made of synthetic resin and having a rectangular parallelepiped shape. However, since any shape that can hold the connecting conductive members 24A stably can be used to implement the invention, the shape of the positive electrode intermediate member 24 is not limited to a rectangular parallelepiped. For example, cutout portions 24X could be formed in between the positive electrode connecting conductive members 24A as in the positive electrode intermediate member $24_1$ of a Seventh Embodiment of the invention shown in FIG. 7A, or through holes 24Yy could be formed longitudinally as in the positive electrode intermediate member $24_2$ of an Eighth Embodiment of the invention shown in FIG. 7B, or apertures 24Z could be formed in between the positive electrode connecting conductive members 24A as in the positive electrode intermediate member $24_3$ of a Ninth Embodiment of the invention shown in FIG. 7C. If such structures are employed, the cutout portions 24X, through holes 24Y, apertures 24Z, or the like will act as gas venting routes, so that any gas that may be generated in the electrode assembly interior if abnormality occurs in the battery can easily be expelled to the exterior of the electrode assembly, and since the pressure-reduction type current interruption mechanism, gas exhaust valve, and so forth, with which a prismatic sealed battery is normally equipped will be activated stably, safety can be secured, and a high-reliability prismatic sealed secondary battery can be manufactured.

Tenth Embodiment

The positive electrode connecting conductive members 24E of a Tenth Embodiment of the invention will now be described using FIGS. 8A to 8D. Note that FIG. 8A is a front view of a positive electrode connecting conductive member in the Tenth Embodiment, FIG. 8B is a longitudinal sectional view through FIG. 8A, FIG. 8C is a top view of a ring-shaped insulating seal material, and FIG. 8D is a longitudinal sectional view of the positive electrode intermediate member in the Tenth Embodiment.

The positive electrode connecting conductive members 24E of the Tenth Embodiment is the positive electrode connecting conductive members 24B of the Second Embodiment shown in FIG. 8A, but with the insulating seal material 26, which is formed from ring-shaped insulative thermally melt-bonding resin, disposed around the truncated cone-shaped protrusion 24b. The height of this insulating seal material 26 is smaller than the height H of the truncated cone-shaped protrusion 24b.

The surfaces 24g provided with chamfered portions are formed in the positive electrode connecting conductive members 24E of the Tenth Embodiment, and so when the positive electrode connecting conductive members 24E are disposed inside the two split groups of stacked positive electrode substrate exposed portions 14 so that each of the truncated cone-shaped protrusions 24b on the two ends of the positive electrode connecting conductive members 24E contacts against the stacked positive electrode substrate exposed portions 14, little damage will be caused to the stacked positive electrode substrate exposed portions 14, and insertion as far as the position for welding to the positive electrode substrate exposed portions 14 will be easy. Hence, the weldability will be improved.

In the positive electrode connecting conductive members 24E of the Tenth Embodiment, insulating seal materials 26 which are formed from ring-shaped insulative thermally melt-bonding resin are disposed around the truncated cone-shaped protrusions 24b on the two ends. During resistance welding, the stacked positive electrode substrate exposed portions 14 are pushed by the resistance welding electrodes toward the positive electrode connecting conductive members 24E, and so the protrusions 24b of the positive electrode connecting conductive members 24E bite into the stacked positive electrode substrate exposed portions 14, thus contacting with the stacked positive electrode substrate exposed portions 14. With insulating seal materials 26 disposed in a ring shape around the protrusions 24b of the positive electrode connecting conductive members 24E as mentioned above, any spattered high-temperature dust that may occur during resistance welding can be blocked by the insulating seal materials 26 and captured in the interior of the insulating seal materials 26 or between the protrusions 24b and the insulating seal materials 26.

Moreover, in the positive electrode connecting conductive members 24E of the Tenth Embodiment, because the insulating seal materials 26 are formed from insulative thermally melt-bonding resin, any spattered high-temperature dust that occurs during resistance welding will partially melt the solid insulative thermally melt-bonding resin and thereby be deprived of heat, rapidly cool, and fall in temperature, with the result that it will easily be captured inside the insulating seal materials 26 constituted of solid insulative thermally melt-bonding resin. Note that since, during resistance welding, the duration for which the current is passed is short and moreover the area over which the current flows is narrow, it will seldom occur that all of the insulating seal materials 26 constituted of insulative thermally melt-bonding resin will melt at the same time. Therefore, it will seldom occur that spattered dust that occurs during resistance welding will disperse from the insulating seal materials 26 and enter into the interior of the flattened electrode assembly. Hence, a sealed battery can be obtained that has lower occurrence of internal short-circuits and higher reliability.

Note that the insulative thermally melt-bonding resin will preferably have a melting temperature of 70 to 150° C. and dissolving temperature of 200° C. or higher, and will preferably further have chemical resistance with regard to electrolyte and the like. For example, a rubber-based seal material, acid-denatured polypropylene, or polyolefin-based thermally melt-bonding resin may be used. Furthermore, the insulating seal material may be insulating tape with adhesive, for which polyimide tape, polypropylene tape, polyphenylene sulfide tape, or the like can be used. Moreover, the whole material may consist of insulative thermally melt-bonding resin, or it may have a multilayer structure that includes insulative thermally melt-bonding resin layers.

Note that although the descriptions of the First to Tenth Embodiments above concerned the positive electrode part, the negative electrode part employs the same structure—except for different physical properties of the materials of the negative electrode substrate exposed portions 15, negative electrode collector members 18, negative electrode intermediate member 25, negative electrode connecting conductive members 25A, and negative electrode collection receiving member (not shown in the figures), and therefore, yields substantially the same effects and advantages. Furthermore, the invention does not necessarily have to be employed in both the positive electrode part and the negative electrode part, and may be applied to the positive electrode part alone or to the negative electrode part alone.

In the manufacture of a sealed battery of the invention it is possible to use positive electrode connecting conductive members and negative electrode connecting conductive members with protrusions of differing shapes. Differing metallic materials are used for the positive electrode substrates and the negative electrode substrates of an ordinary sealed battery. For example, in a lithium ion secondary battery, aluminum or aluminum alloy is used for the positive electrode substrates and copper or copper alloy is used for the negative electrode substrates. Because copper and copper alloy have low electrical resistance compared with aluminum and aluminum alloy, it is more difficult to resistance-weld the negative electrode substrate exposed portions than to resistance-weld the positive electrode substrate exposed portions, and hard-to-melt portions are prone to occur in the stacked negative electrode substrate exposed portion interior.

In such a case, it will be desirable, in order to concentrate the electric current and render the resistance welding easy to perform, to use protrusions with apertures formed therein for the shape of the protrusions of the negative electrode connecting conductive members that are used between the negative electrode substrate exposed portions, while for the shape of the protrusions of the positive electrode connecting conductive members that are used between the positive electrode substrate exposed portions, it will be desirable to use protrusions without apertures formed therein, so that the resistance welding will proceed easily and the positive electrode connecting conductive members will be less liable to deform.

The foregoing embodiments and figures set forth examples in which, for simplicity of description, welding is carried out using one intermediate member, which holds two connecting conductive members, for the substrate exposed portions of each electrode. However, the number of connecting conductive members can of course be one or three or more, and can be determined appropriately in accordance with the size, required output, and other characteristics of the battery.

What is claimed is:
1. A prismatic sealed secondary battery comprising:
    a positive electrode plate;
    a negative electrode plate;
    a separator interposed between the positive electrode plate and the negative electrode plate;
    a first group of positive electrode substrate exposed portions;
    a second group of positive electrode substrate exposed portions;
    negative electrode substrate exposed portions;
    a resin material disposed between the first group of positive electrode substrate exposed portions and the second group of positive electrode substrate exposed portions;
    a positive collector member that is electrically joined to the first group of positive electrode substrate exposed portions and the second group of positive electrode exposed portions;
    a negative collector member that is electrically joined to the negative electrode substrate exposed portions;
    a prismatic outer can including a mouth portion, a bottom, a first side surface, and a second side surface; and
    a sealing plate sealing the mouth portion of the prismatic outer can;

wherein the prismatic outer can accommodates the positive electrode plate, the negative electrode plate, the separator, the first group of positive electrode substrate exposed portions, the second group of positive electrode substrate exposed portions, and the negative electrode substrate exposed portions;

wherein the first side surface of the prismatic outer can is perpendicular to the bottom of the prismatic outer can;

wherein the second side surface of the prismatic outer can is perpendicular to the bottom of the prismatic outer can;

wherein the first side surface of the prismatic outer can and the second side surface of the prismatic outer can are parallel to each other;

wherein the first group of positive electrode substrate exposed portions and the second group of positive electrode substrate exposed portions are arranged on the first side surface side of the prismatic outer can;

wherein the negative electrode substrate exposed portions are arranged on the second side surface side of the prismatic outer can;

wherein a distance from the first side surface of the prismatic outer can to a portion of the resin material which is nearest to the first side surface of the prismatic outer can is less than a distance from the first side surface of the prismatic outer can to a portion of the first group of positive electrode substrate exposed portions which is nearest to the first side surface of the prismatic outer can;

wherein the distance from the first side surface of the prismatic outer can to the portion of the resin material which is nearest to the first side surface of the prismatic outer can is less than a distance from the first side surface of the prismatic outer can to a portion of the second group of positive electrode substrate exposed portions which is nearest to the first side surface of the prismatic outer can; and wherein the distance from the first side surface of the prismatic outer can to the portion of the resin material which is nearest to the first side surface of the prismatic outer can is less than a distance from the first side surface of the prismatic outer can to a portion of the positive collector member which is nearest to the first side surface of the prismatic outer can.

2. The prismatic sealed secondary battery according to claim 1,
wherein the positive collector member is a folded-metal sheet joined to the first group of positive electrode substrate exposed portions by welding; and
wherein the positive collector member is in physical direct contact with the first group of positive electrode substrate exposed portions at a region in which the positive collector member and the first group of positive electrode substrate exposed portions are welded together.

3. The prismatic sealed secondary battery according to claim 2, further comprising a positive electrode terminal,
wherein the sealing plate has a through-hole, and
wherein the positive electrode terminal passes through the sealing plate at the through-hole and the positive electrode terminal is in physical direct contact with the positive collector member.

4. The prismatic sealed secondary battery according to claim 1, wherein a distance from the first side surface of the prismatic outer can to a portion of the resin material which is farthest from the first side surface of the prismatic outer can is less than a distance from the first side surface of the prismatic outer can to a portion of the first group of positive electrode substrate exposed portions and the second group of positive electrode substrate exposed portions which is farthest from the first side surface of the prismatic outer can.

5. The prismatic sealed secondary battery according to claim 1,
wherein an insulating resin sheet is disposed between the resin material and the first side surface of the prismatic outer can, and
wherein the insulating resin sheet is not integral with the resin material.

6. The prismatic sealed secondary battery according to claim 1, wherein the resin material has a through hole.

7. The prismatic sealed secondary battery according to claim 1, wherein the resin material has a cutout portion.

8. The prismatic sealed secondary battery according to claim 1, wherein the resin material has an aperture.

9. The prismatic sealed secondary battery according to claim 1, wherein the resin material is directly contacted with both of the first group of positive electrode substrate exposed portions and the second group of positive electrode substrate exposed portions.

10. A prismatic sealed secondary battery comprising:
a positive electrode plate;
a negative electrode plate;
a separator interposed between the positive electrode plate and the negative electrode plate;
a first group of negative electrode substrate exposed portions;
a second group of negative electrode substrate exposed portions;
positive electrode substrate exposed portions;
a resin material disposed between the first group of negative electrode substrate exposed portions and the second group of negative electrode substrate exposed portions;
a positive collector member that is electrically joined to the positive electrode substrate exposed portions;
a negative collector member that is electrically joined to the first group of negative electrode substrate exposed portions and the second group of negative electrode substrate exposed portions;
a prismatic outer can including a mouth portion, a bottom, a first side surface, and a second side surface; and
a sealing plate sealing the mouth portion of the prismatic outer can;
wherein the prismatic outer can accommodates the positive electrode plate, the negative electrode plate, the separator, the first group of negative electrode substrate exposed portions, the second group of negative electrode substrate exposed portions, and the positive electrode substrate exposed portions,
wherein the first side surface of the prismatic outer can is perpendicular to the bottom of the prismatic outer can;
wherein the second side surface of the prismatic outer can is perpendicular to the bottom of the prismatic outer can;
wherein the first side surface of the prismatic outer can and the second side surface of the prismatic outer can are parallel to each other;
wherein the first group of negative electrode substrate exposed portions and the second group of negative electrode substrate exposed portions are arranged on the first side surface side of the prismatic outer can;
wherein the positive electrode substrate exposed portions are arranged on the second side surface side of the prismatic outer can;

wherein a distance from the first side surface of the prismatic outer can to a portion of the resin material which is nearest to the first side surface of the prismatic outer can is less than a distance from the first side surface of the prismatic outer can to a portion of the first group of negative electrode substrate exposed portions which is nearest to the first side surface of the prismatic outer can;

wherein the distance from the first side surface of the prismatic outer can to the portion of the resin material which is nearest to the first side surface of the prismatic outer can is less than a distance from the first side surface of the prismatic outer can to a portion of the second group of negative electrode substrate exposed portions which is nearest to the first side surface of the prismatic outer can;

wherein the distance from the first side surface of the prismatic outer can to the portion of the resin material which is nearest to the first side surface of the prismatic outer can is less than a distance from the first side surface of the prismatic outer can to a portion of the negative collector member which is nearest to the first side surface of the prismatic outer can.

11. The prismatic sealed secondary battery according to claim 10,
wherein the negative collector member is a folded-metal sheet joined to the first group of negative electrode substrate exposed portions by welding; and
wherein the negative collector member is in physical direct contact with the first group of negative electrode substrate exposed portions at a region in which the negative collector member and the first group of negative electrode substrate exposed portions are welded together.

12. The prismatic sealed secondary battery according to claim 11, further comprising a negative electrode terminal,
wherein the sealing plate has a through-hole, and
wherein the negative electrode terminal passes through the sealing plate at the through-hole and the negative electrode terminal is in physical direct contact with the negative collector member.

13. The prismatic sealed secondary battery according to claim 10, wherein a distance from the first side surface of the prismatic outer can to a portion of the resin material which is farthest from the first side surface of the prismatic outer can is less than a distance from the first side surface of the prismatic outer can to a portion of the first group of negative electrode substrate exposed portions and the second group of negative electrode substrate exposed portions which is farthest from the first side surface of the prismatic outer can.

14. The prismatic sealed secondary battery according to claim 10,
wherein an insulating resin sheet is disposed between the resin material and the first side surface of the prismatic outer can, and
wherein the insulating resin sheet is not integral with the resin material.

15. The prismatic sealed secondary battery according to claim 10, wherein the resin material has a through hole.

16. The prismatic sealed secondary battery according to claim 10, wherein the resin material has a cutout portion.

17. The prismatic sealed secondary battery according to claim 10, wherein the resin material has an aperture.

18. The prismatic sealed secondary battery according to claim 10, wherein the resin material is directly contacted with both of the first group of negative electrode substrate exposed portions and the second group of negative electrode substrate exposed portions.

* * * * *